(12) United States Patent
Walton et al.

(10) Patent No.: US 8,563,658 B2
(45) Date of Patent: *Oct. 22, 2013

(54) BLOCK COMPOSITES IN THERMOPLASTIC VULCANIZATE APPLICATIONS

(75) Inventors: Kim L. Walton, Lake Jackson, TX (US);
Brian W. Walther, Clute, TX (US);
Robert T. Johnston, Lake Jackson, TX (US);
Jose M. Rego, Houston, TX (US);
Xiaosong (Sharon) Wu, Sugar Land, TX (US)

(73) Assignee: Dow Global Technologies, LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/499,862

(22) PCT Filed: Oct. 1, 2010

(86) PCT No.: PCT/US2010/051160
§ 371 (c)(1),
(2), (4) Date: Apr. 27, 2012

(87) PCT Pub. No.: WO2011/041699
PCT Pub. Date: Apr. 7, 2011

(65) Prior Publication Data
US 2012/0208962 A1    Aug. 16, 2012

Related U.S. Application Data

(60) Provisional application No. 61/248,147, filed on Oct. 2, 2009.

(51) Int. Cl.
*C08L 53/00*    (2006.01)

(52) U.S. Cl.
USPC ........ 525/323; 525/240; 525/191; 525/332.5; 525/324

(58) Field of Classification Search
USPC ............... 525/240, 191, 332.5, 323, 324
See application file for complete search history.

(56) References Cited

U.S. PATENT DOCUMENTS

| | | | |
|---|---|---|---|
| 5,783,512 | A | 7/1998 | Jacobsen et al. |
| 5,919,983 | A | 7/1999 | Rosen et al. |
| 5,977,251 | A | 11/1999 | Kao et al. |
| 6,103,657 | A | 8/2000 | Murray |
| 6,319,989 | B1 | 11/2001 | Anderson et al. |
| 6,320,005 | B1 | 11/2001 | Murray |
| 6,683,149 | B2 | 1/2004 | Jain et al. |
| 6,953,764 | B2 | 10/2005 | Frazier et al. |
| 7,300,994 | B2 | 11/2007 | Coates et al. |
| 7,319,121 | B2 * | 1/2008 | Jacob ........................ 525/93 |
| 7,355,089 | B2 | 4/2008 | Chang et al. |

(Continued)

FOREIGN PATENT DOCUMENTS

WO    03/082971 A2    10/2003

OTHER PUBLICATIONS

Elliott et al., J. App. Poly. Sci., 14, pp. 2947-2963 (1970) A One-Point Intrinsic Viscosity Method for Polywethylene and Polypropylene.

(Continued)

*Primary Examiner* — Mark Kaucher

(57) ABSTRACT

Embodiments of the invention provide block composites and their use in thermoplastic vulcanizate compounds.

10 Claims, 15 Drawing Sheets

(56) References Cited

U.S. PATENT DOCUMENTS

| | | | |
|---|---|---|---|
| 7,579,408 B2 | 8/2009 | Walton et al. | |
| 7,598,328 B2 | 10/2009 | Coalter, III et al. | |
| 7,608,668 B2 | 10/2009 | Li Pi Shan et al. | |
| 8,198,374 B2 | 6/2012 | Arriola et al. | |
| 8,273,888 B2 | 9/2012 | Grote et al. | |
| 8,318,896 B2 | 11/2012 | Winniford et al. | |
| 2001/0039320 A1* | 11/2001 | Jacobsen et al. | 526/348.2 |
| 2002/0177711 A1 | 11/2002 | LaPointe et al. | |
| 2006/0199910 A1* | 9/2006 | Walton et al. | 525/192 |
| 2006/0199930 A1 | 9/2006 | Li Pi Shan et al. | |
| 2007/0167578 A1 | 7/2007 | Arriola et al. | |
| 2007/0219334 A1* | 9/2007 | Li Pi Shan et al. | 526/348 |
| 2008/0269412 A1 | 10/2008 | Carnahan et al. | |
| 2008/0311812 A1 | 12/2008 | Arriola et al. | |
| 2010/0093964 A1 | 4/2010 | Van Damme et al. | |
| 2010/0113698 A1 | 5/2010 | Walton et al. | |
| 2010/0197880 A1 | 8/2010 | Shan et al. | |
| 2011/0001535 A1 | 1/2011 | Iyer et al. | |
| 2011/0082249 A1 | 4/2011 | Shan et al. | |
| 2011/0082257 A1 | 4/2011 | Carnahan et al. | |
| 2011/0082258 A1* | 4/2011 | Walton et al. | 525/89 |

OTHER PUBLICATIONS

W. H. Ray, J. Macromol. Sci., Rev., C8 (1) 1-56 (1972) On the Mathematical Modeling of Polymerization Reactors.

AE. Hamielec and J. F. Macgregor, "Polymer Reaction Engineering", K.H. Reichert and W. Geisler, Eds., Hanser, Munich, 1983.

Williams and Ward, J. Polym. Sci.. Polym. Let., 6, 621 (1968)): Mpotypropylene=0.645(Mpotystyrene).

Ruokolainen, et al, Macromolecules, vol. 38, No. 3, p. 857, 2005 Morphology and Thermodynamic Behavior of Syndiotactic Polypropylene-Poly (ethylene-co-propylene) Block Polymers Prepared by Living Olefin Polymerization.

PCT/US2010/051160 International Search Report and Written Opinion of the International Searching Authority.

PCT/US2010/051160 International Preliminary Report on Patentability.

\* cited by examiner

BLOCK COMPOSITES IN THERMOPLASTIC VULCANIZATE APPLICATIONS

CROSS-REFERENCE TO RELATED PATENT APPLICATIONS

This application claims priority from U.S. Provisional Application Ser. No. 61/248,147, filed Oct. 2, 2009. This application is also related to the following U.S. Provisional Patent Applications also filed Oct. 2, 2009 with Ser. Nos. 61/248,160; and 61/248,170. For purposes of United States patent practice, the contents of these applications are herein incorporated by reference in their entirety.

FIELD OF THE INVENTION

This invention relates to block composites and their use in thermoplastic vulcanizates.

BACKGROUND OF THE INVENTION

Elastomers are defined as materials which experience large reversible deformations under relatively low stress Some examples of commercially available elastomers include natural rubber, ethylene/propylene (EPM) copolymers, ethylene/propylene/diene (EPDM) copolymers, styrene/butadiene copolymers, chlorinated polyethylene, and silicone rubber.

Thermoplastic elastomers are elastomers having thermoplastic properties. That is, thermoplastic elastomers are optionally molded or otherwise shaped and reprocessed at temperatures above their melting or softening point. One example of a thermoplastic elastomer is styrene-butadiene-styrene (SBS) block copolymer. SBS block copolymers exhibit a two phase morphology consisting of glassy polystyrene domains connected by rubbery butadiene segments.

Thermoset elastomers are elastomers having thermoset properties. That is, thermoset elastomers irreversibly solidify or "set" when heated, generally due to an irreversible crosslinking reaction. Two examples of thermoset elastomers are crosslinked ethylene-propylene monomer rubber (EPM) and crosslinked ethylene-propylene-diene monomer rubber (EPDM). EPM materials are made by copolymerization of ethylene and propylene. EPM materials are typically cured with peroxides to give rise to crosslinking, and thereby induce thermoset properties. EPDM materials are linear interpolymers of ethylene, propylene, and a nonconjugated diene such as 1,4-hexadiene, dicyclopentadiene, or ethylidene norbornene. EPDM materials are typically vulcanized with sulfur to induce thermoset properties, although they also can be cured with peroxides. While EPM and EPDM thermoset materials are advantageous in that they have applicability in higher temperature applications, EPM and EPDM elastomers have relatively low green strength (at lower ethylene contents), relatively low oil resistance, and relatively low resistance to surface modification.

Thermoplastic vulcanizates (TPV's) comprises thermoplastic matrices, preferably crystalline, through which thermoset elastomers are generally uniformly distributed. Examples of thermoplastic vulcanizates include ethylene-propylene monomer rubber and ethylene-propylene-diene monomer rubber thermoset materials distributed in a crystalline polypropylene matrix. One example of a commercial TPV is Satoprene® thermoplastic rubber which is manufactured by Advanced Elastomer Systems and is a mixture of crosslinked EPDM particles in a crystalline polypropylene matrix. These materials have found utility in many applications which previously used vulcanized rubber, e.g., hoses, gaskets, and the like.

Commercial TPVs are typically based on vulcanized rubbers in which a phenolic resin or sulfur cure system is used to vulcanize, that is to crosslink, a diene (or more generally, a polyene) copolymer rubber by way of dynamic vulcanization, that is crosslinking while mixing (typically vigorously), in a thermoplastic matrix.

Although numerous types of thermoplastic vulcanizates are known, there is still a need for improved thermoplastic materials having elastomeric properties. Specifically, there is a need for a method to produce thermoplastic vulcanizates having improved tensile properties, elongation, compression set, and/or oil resistance.

SUMMARY OF THE INVENTION

Thermoplastic vulcanizates have now been discovered that have improved elastomeric properties, particularly improved compression set at elevated temperatures. These new thermoplastic vulcanizates are obtained from a reaction mixture comprising:
(i) a thermoplastic polyolefin
(ii) a vulcanizable elastomer
(iii) a crosslinking agent; and,
(iv) a block composite.

DESCRIPTION OF EMBODIMENTS OF THE INVENTION

Definitions

Figure 1:
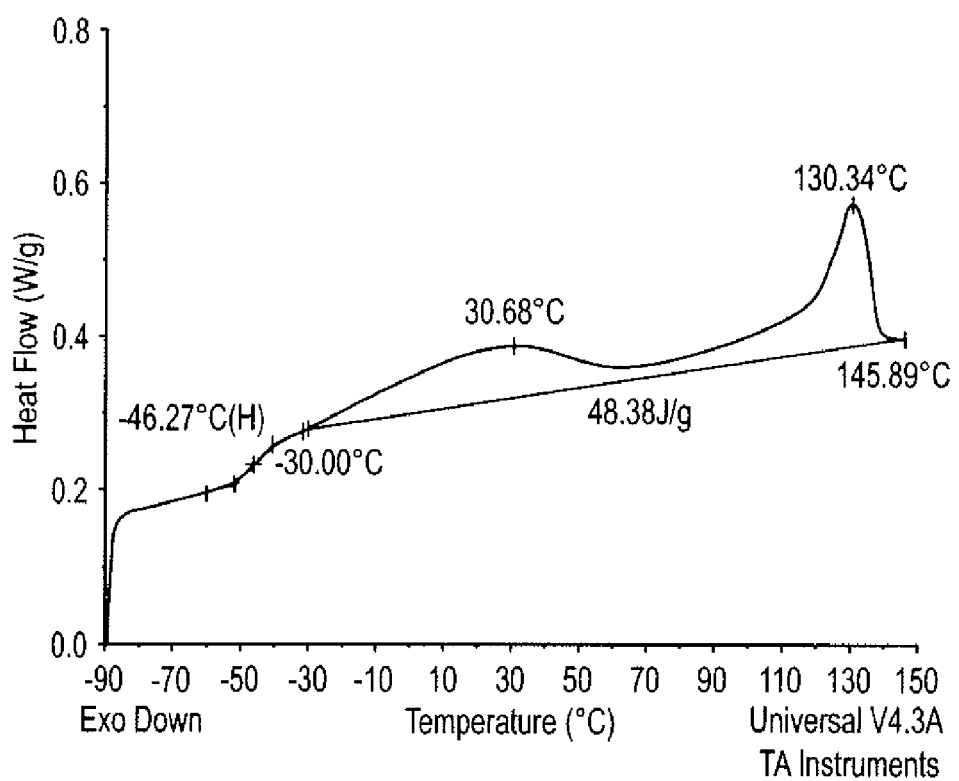
FIG. 1 shows the DSC melting curve for Example B1.

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

The term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The term "polymer", includes both conventional homopolymers, that is, homogeneous polymers prepared from a single monomer, and copolymers (interchangeably referred to herein as interpolymers), meaning polymers prepared by reaction of at least two monomers or otherwise containing chemically differentiated segments or blocks therein even if formed from a single monomer. More specifically, the term "polyethylene" includes homopolymers of ethylene and copolymers of ethylene and one or more $C_{3-8}$ α-olefins in which ethylene comprises at least 50 mole percent. The term "propylene copolymer" or "propylene interpolymer" means a copolymer comprising propylene and one or more copolymerizable comonomers, wherein a plurality of the polymerized monomer units of at least one block or segment in the polymer (the crystalline block) comprise propylene, preferably at least 90 mole percent, more preferably at least 95 mole percent, and most preferably at least 98 mole percent. A polymer made primarily from a different α-olefin, such as 4-methyl-1-pentene would be named similarly. The term "crystalline" if employed, refers to a polymer or polymer block that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point. The term, "isotactic" is defined as polymer repeat units having at least 70 percent isotactic pentads as determined by $^{13}$C-NMR analysis. "Highly isotactic" is defined as polymers having at least 90 percent isotactic pentads.

The term "block copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The block copolymers of the invention are characterized by unique distributions of both polymer polydispersity (PDI or Mw/Mn), block length distribution, and/or block number distribution, due, in a preferred embodiment, to the effect of the shuttling agent(s) in combination with the catalyst(s).

The term "block composite" refers to the novel polymers of the invention comprising a soft copolymer, a hard polymer and a block copolymer having a soft segment and a hard segment, wherein the hard segment of the block copolymer is the same composition as the hard polymer in the block composite and the soft segment of the block copolymer is the same composition as the soft copolymer of the block composite. The block copolymers can be linear or branched. More specifically, when produced in a continuous process, the block composites desirably possess PDI from 1.7 to 15, preferably from 1.8 to 3.5, more preferably from 1.8 to 2.2, and most preferably from 1.8 to 2.1. When produced in a batch or semi-batch process, the block composites desirably possess PDI from 1.0 to 2.9, preferably from 1.3 to 2.5, more preferably from 1.4 to 2.0, and most preferably from 1.4 to 1.8.

"Hard" segments refer to highly crystalline blocks of polymerized units in which the monomer is present in an amount greater than 95 weight percent, and preferably greater than 98 weight percent. In other words, the comonomer content in the hard segments is less than 5 weight percent, and preferably less than 2 weight percent. In some embodiments, the hard segments comprise all or substantially all propylene units. "Soft" segments, on the other hand, refer to amorphous, substantially amorphous or elastomeric blocks of polymerized units in which the comonomer content is greater than 10 mol %.

The term "thermoplastic vulcanizate" (TPV) refers to an engineering thermoplastic elastomer in which a cured elastomeric phase is dispersed in a thermoplastic matrix. It typically comprises at least one thermoplastic material and at least one cured (i.e., cross-linked) elastomeric material. Preferably, the thermoplastic material forms the continuous phase, and the cured elastomer forms the discrete phase; that is, domains of the cured elastomer are dispersed in the thermoplastic matrix. Preferably, the domains of the cured elastomer are fully and uniformly dispersed with the average domain size in the range from about 0.1 micron to about 100 micron, from about 0.1 micron to about 50 microns; from about 0.1 micron to about 25 microns; from about 0.1 micron to about 10 microns, or from about 0.11 micron to about 5 microns. In some embodiments, the matrix phase of the TPV is present by less than about 50% by volume of the TPV, and the dispersed phase is present by at least about 50% by volume of the TPV. In other words, the crosslinked elastomeric phase is the major phase in the TPV, whereas the thermoplastic polymer is the minor phase. TPVs with such phase composition have good compression set. However, TPVs with the major phase being the thermoplastic polymer and the minor phase being the crosslinked elastomer may also be made. Generally, the cured elastomer has a portion that is insoluble in cyclohexane at 23° C. The amount of the insoluble portion is preferably more than about 75% or about 85%. In some cases, the insoluble amount is more than about 90%, more than about 93%, more than about 95% or more than about 97% by weight of the total elastomer.

The branching index quantifies the degree of long chain branching in a selected thermoplastic polymer. Preferably, the branching index is less than about 0.9, 0.8, 0.7, 0.6 or 0.5. In some embodiments, the branching index is in the range from about 0.01 to about 0.4. In other embodiments, the branching index is less than about 0.01, less than about 0.001, less than about 0.0001, less than about 0.00001, or less than about 0.000001. It is defined by the following equation:

$$g' = \frac{IV_{Br}}{IV_{Lin}}\bigg|_{M_w}$$

where g' is the branching index, $IV_{Br}$ is the intrinsic viscosity of the branched thermoplastic polymer (e.g., polypropylene) and $IV_{Lin}$ is the intrinsic viscosity of the corresponding linear thermoplastic polymer having the same weight average molecular weight as the branched thermoplastic polymer and, in the case of copolymers and terpolymers, substantially the same relative molecular proportion or proportions of monomer units.

Intrinsic viscosity, also known as the limiting viscosity number, in its most general sense is a measure of the capacity of a polymer molecule to enhance the viscosity of a solution. This depends on both the size and the shape of the dissolved polymer molecule. Hence, in comparing a nonlinear polymer with a linear polymer of substantially the same weight average molecular weight, it is an indication of configuration of the nonlinear polymer molecule. Indeed, the above ratio of intrinsic viscosities is a measure of the degree of branching of the nonlinear polymer. A method for determining intrinsic viscosity of propylene polymer material is described by Elliott et al., J. App. Poly. Sci., 14, pp 2947-2963 (1970). In this specification the intrinsic viscosity in each instance is determined with the polymer dissolved in decahydronaphthalene at 135.degree. C. Another method for measuring the intrinsic viscosity of a polymer is ASTM D5225-98—*Standard Test Method for Measuring Solution Viscosity of Polymers with a Differential Viscometer*, which is incorporated by reference herein in its entirety.

Embodiments of the invention provide a kind of thermoplastic vulcanizate (TPV) composition and a process for making various TPVs. Such TPVs may have a lower compression set, lower tensile set, higher tensile strength, elongation, tear strength, abrasion resistance, better dynamic properties and/or oil resistance. First, a typical thermoplastic vulcanizate composition comprises a mixture or reaction product of (1) a thermoplastic polymer; (2) a vulcanizable elastomer; and (3) a cross-linking agent capable of vulcanizing the elastomer. Preferably, the cross-linking agent does not substantially degrade or cross-link the thermoplastic polymer. Alternatively, the thermoplastic vulcanizate composition of the invention comprises a mixture or reaction product of (1) a thermoplastic polymer; (2) a vulcanizable elastomer; (3) a compatibilizer; and (4) a cross-linking agent capable of vulcanizing the elastomer, wherein the block composites in any chemical form are used as a compatibilizer between the thermoplastic polymer and the vulcanizable elastomer. When used as compatibilizer, the block composite is present in the TPV by less than 50 percent but greater than zero percent by weight of the total composition. Preferably, the block composite is present in an amount of less than 40 percent but greater than zero percent by weight, less than 30 percent but greater than zero percent by weight, less than 20 percent but greater than zero percent by weight, less than 10 percent but greater than zero percent by weight, less than 8 percent by weight but greater than zero percent, less than 6 percent but greater than zero percent by weight, or less than 5 percent but greater than zero percent by weight.

The block composite polymers of the invention are preferably prepared by a process comprising contacting an addition polymerizable monomer or mixture of monomers under addition polymerization conditions with a composition comprising at least one addition polymerization catalyst, a cocatalyst and a chain shuttling agent, said process being characterized by formation of at least some of the growing polymer chains under differentiated process conditions in two or more reactors operating under steady state polymerization conditions or in two or more zones of a reactor operating under plug flow polymerization conditions.

In a preferred embodiment, the block composites of the invention comprise a fraction of block polymer which possesses a most probable distribution of block lengths. Preferred polymers according to the invention are block copolymers containing 2 or 3 blocks or segments. In a polymer containing three or more segments (that is blocks separated by a distinguishable block) each block may be the same or chemically different and generally characterized by a distribution of properties. In a process for making the polymers, chain shuttling is used as a way to prolong the lifetime of a polymer chain such that a substantial fraction of the polymer chains exit at least the first reactor of a multiple reactor series or the first reactor zone in a multiple zoned reactor operating substantially under plug flow conditions in the form of polymer terminated with a chain shuttling agent, and the polymer chain experiences different polymerization conditions in the next reactor or polymerization zone. Different polymerization conditions in the respective reactors or zones include the use of different monomers, comonomers, or monomer/comonomer(s) ratio, different polymerization temperatures, pressures or partial pressures of various monomers, different catalysts, differing monomer gradients, or any other difference leading to formation of a distinguishable polymer segment. Thus, at least a portion of the polymer comprises two, three, or more, preferably two or three, differentiated polymer segments arranged intramolecularly.

The following mathematical treatment of the resulting polymers is based on theoretically derived parameters that are believed to apply and demonstrate that, especially in two or more steady-state, continuous reactors or zones connected in series, having differing polymerization conditions to which the growing polymer is exposed, the block lengths of the polymer being formed in each reactor or zone will conform to a most probable distribution, derived in the following manner, wherein pi is the probability of polymer propagation in a reactor with respect to block sequences from catalyst i. The theoretical treatment is based on standard assumptions and methods known in the art and used in predicting the effects of polymerization kinetics on molecular architecture, including the use of mass action reaction rate expressions that are not affected by chain or block lengths, and the assumption that polymer chain growth is completed in a very short time compared to the mean reactor residence time. Such methods have been previously disclosed in W. H. Ray, J. Macromol. Sci., Rev. Macromol. Chem., C8, 1 (1972) and A. E. Hamielec and J. F. MacGregor, "Polymer Reaction Engineering", K. H. Reichert and W. Geisler, Eds., Hanser, Munich, 1983. In addition, it is assumed that each incidence of the chain shuttling reaction in a given reactor results in the formation of a single polymer block, whereas transfer of the chain shuttling agent terminated polymer to a different reactor or zone and exposure to different polymerization conditions results in formation of a different block. For catalyst i, the fraction of sequences of length n being produced in a reactor is given by Xi[n], where n is an integer from 1 to infinity representing the total number of monomer units in the block.

$$Xi[n] = (1 - pi)pi(n - 1)$$

most probable distribution of block lengths $$Ni = \frac{1}{1 - pi}$$ number average block length If more than one catalyst is present in a reactor or zone, each catalyst has a probability of propagation (pi) and therefore has a unique average block length and distribution for polymer being made in that reactor or zone. In a most preferred embodiment the probability of propagation is defined as:

$$pi = \frac{Rp[i]}{Rp[i] + Rt[i] + Rs[i] + [Ci]}$$ for each catalyst $i = \{1, 2 \ldots \}$, where, Rp[i]=Local rate of monomer consumption by catalyst i, (moles/L/time),
Rt[i]=Total rate of chain transfer and termination for catalyst i, (moles/L/time), and
Rs[i]=Local rate of chain shuttling with dormant polymer, (moles/L/time).

For a given reactor the polymer propagation rate, Rp[i], is defined using an apparent rate constant, $\overline{kpi}$, multiplied by a total monomer concentration, [M], and multiplied by the local concentration of catalyst i, [Ci], as follows:

$$Rp[i] = \overline{kpi}[M][Ci]$$

The chain transfer, termination, and shuttling rate is determined as a function of chain transfer to hydrogen (H2), beta hydride elimination, and chain transfer to chain shuttling agent (CSA). The quantities [H2] and [CSA] are molar concentrations and each subscripted k value is a rate constant for the reactor or zone:

$$Rt[i] = kH2i[H2][Ci] + k\beta i[Ci] + kai[CSA][Ci]$$

Dormant polymer chains are created when a polymer moiety transfers to a CSA and all CSA moieties that react are assumed to each be paired with a dormant polymer chain. The rate of chain shuttling of dormant polymer with catalyst i is given as follows, where [CSAf] is the feed concentration of CSA, and the quantity ([CSAf]−[CSA]) represents the concentration of dormant polymer chains:

$$Rs[i] = kai[Ci]([CSAf] - [CSA])$$

As a result of the foregoing theoretical treatment, it may be seen that the overall block length distribution for each block of the resulting block copolymer is a sum of the block length distribution given previously by Xi[n], weighted by the local polymer production rate for catalyst i. This means that a polymer made under at least two different polymer forming conditions will have at least two distinguishable blocks or segments each possessing a most probable block length distribution.

Monomers

Suitable monomers for use in preparing the copolymers of the present invention include any addition polymerizable monomer, preferably any olefin or diolefin monomer, more preferably any α-olefin, and most preferably ethylene and at least one copolymerizable comonomer, propylene and at least one copolymerizable comonomer having from 4 to 20 carbons, or 1-butene and at least one copolymerizable comonomer having 2 or from 5 to 20 carbons, or 4-methyl-1-pentene and at least one different copolymerizable comonomer having from 4 to 20 carbons. Preferably, the copolymers comprise propylene and ethylene. Examples of suitable monomers include straight-chain or branched α-olefins of 2 to 30, preferably 2 to 20 carbon atoms, such as ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cycloolefins of 3 to 30, preferably 3 to 20 carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and poly-olefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene, dicyclopentadiene, 7-methyl-1,6-octadiene, 4-ethylidene-8-methyl-1,7-nonadiene, and 5,9-dimethyl-1,4,8-decatriene; aromatic vinyl compounds such as mono- or poly-alkylstyrenes (including styrene, o-methylstyrene, m-methylstyrene, p-methylstyrene, o,p-dimethylstyrene, o-ethylstyrene, m-ethylstyrene and p-ethylstyrene), and functional group-containing derivatives, such as methoxystyrene, ethoxystyrene, vinylbenzoic acid, methyl vinylbenzoate, vinylbenzyl acetate, hydroxystyrene, o-chlorostyrene, p-chloro styrene, divinylbenzene, 3-phenylpropene, 4-phenylpropene and α-methylstyrene, vinylchloride, 1,2-difluoroethylene, 1,2-dichloroethylene, tetrafluoroethylene, and 3,3,3-trifluoro-1-propene, provided the monomer is polymerizable under the conditions employed.

Preferred monomers or mixtures of monomers for use in combination with at least one CSA herein include ethylene; propylene; mixtures of ethylene with one or more monomers selected from the group consisting of propylene, 1-butene, 1-hexene, 4-methyl-1-pentene, 1-octene, and styrene; and mixtures of ethylene, propylene and a conjugated or non-conjugated diene.

Catalysts and Chain Shuttling Agents

Suitable catalysts and catalyst precursors for use in the present invention include metal complexes such as disclosed in WO2005/090426, in particular, those disclosed starting on page 20, line 30 through page 53, line 20, which is herein incorporated by reference. Suitable catalysts are also disclosed in US 2006/0199930; US 2007/0167578; US 2008/0311812; U.S. Pat. No. 7,355,089 B2; or WO 2009/012215, which are herein incorporated by reference with respect to catalysts.

Particularly preferred catalysts are those of the following formula:

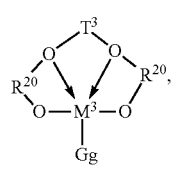

where:

$R^{20}$ is an aromatic or inertly substituted aromatic group containing from 5 to 20 atoms not counting hydrogen, or a polyvalent derivative thereof;

$T^3$ is a hydrocarbylene or silane group having from 1 to 20 atoms not counting hydrogen, or an inertly substituted derivative thereof;

$M^3$ is a Group 4 metal, preferably zirconium or hafnium;

G is an anionic, neutral or dianionic ligand group; preferably a halide, hydrocarbyl or dihydrocarbylamide group having up to 20 atoms not counting hydrogen;

g is a number from 1 to 5 indicating the number of such G groups; and l bonds and electron donative interactions are represented by lines and arrows respectively.

Preferably, such complexes correspond to the formula:

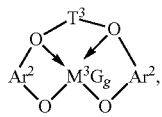

wherein: $T^3$ is a divalent bridging group of from 2 to 20 atoms not counting hydrogen, preferably a substituted or unsubstituted, $C_{3-6}$ alkylene group; and $Ar^2$ independently each occurrence is an arylene or an alkyl- or aryl-substituted arylene group of from 6 to 20 atoms not counting hydrogen;

$M^3$ is a Group 4 metal, preferably hafnium or zirconium;

G independently each occurrence is an anionic, neutral or dianionic ligand group;

g is a number from 1 to 5 indicating the number of such X groups; and electron donative interactions are represented by arrows. Preferred examples of metal complexes of foregoing formula include the following compounds:

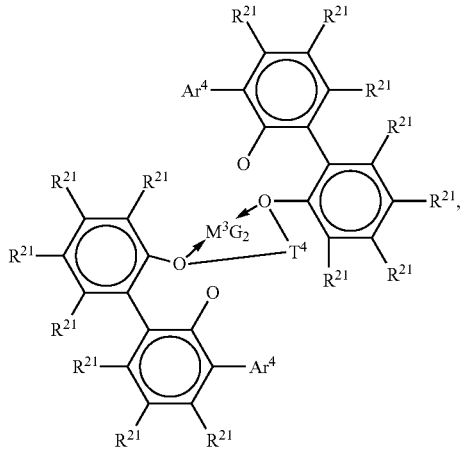

where $M^3$ is Hf or Zr;

$Ar^4$ is $C_{6-20}$ aryl or inertly substituted derivatives thereof, especially 3,5-di(isopropyl)phenyl, 3,5-di(isobutyl)phenyl, dibenzo-1H-pyrrole-1-yl, or anthracen-5-yl, and $T^4$ independently each occurrence comprises a $C_{3-6}$ alkylene group, a $C_{3-6}$ cycloalkylene group, or an inertly substituted derivative thereof;

$R^{21}$ independently each occurrence is hydrogen, halo, hydrocarbyl, trihydrocarbylsilyl, or trihydrocarbylsilylhydrocarbyl of up to 50 atoms not counting hydrogen; and G, independently each occurrence is halo or a hydrocarbyl or trihydrocarbylsilyl group of up to 20 atoms not counting hydrogen, or 2 G groups together are a divalent derivative of the foregoing hydrocarbyl or trihydrocarbylsilyl groups.

Especially preferred are compounds of the formula:

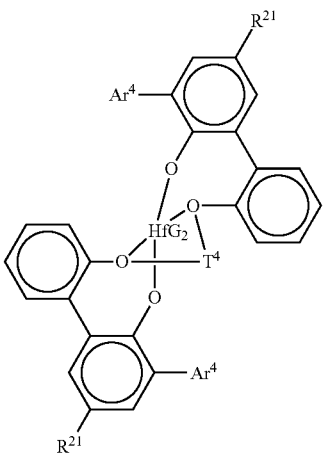

wherein $Ar^4$ is 3,5-di(isopropyl)phenyl, 3,5-di(isobutyl)phenyl, dibenzo-1H-pyrrole-1-yl, or anthracen-5-yl, $R^{21}$ is hydrogen, halo, or $C_{1-4}$ alkyl, especially methyl $T^4$ is propan-1,3-diyl or butan-1,4-diyl, and G is chloro, methyl or benzyl.

Other suitable metal complexes are those of the formula:

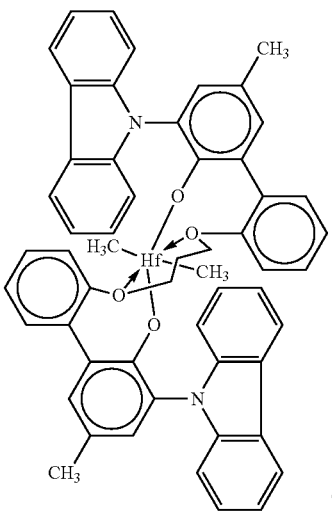

or

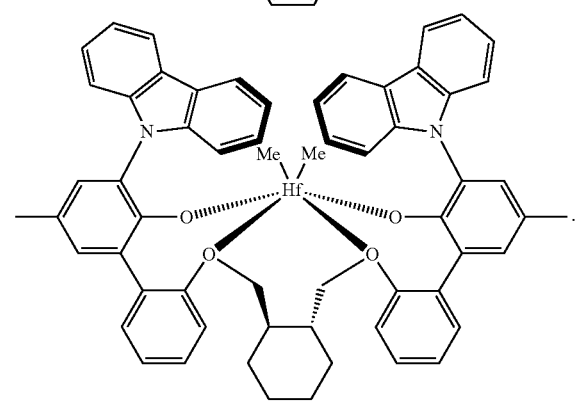

The foregoing polyvalent Lewis base complexes are conveniently prepared by standard metallation and ligand exchange procedures involving a source of the Group 4 metal and the neutral polyfunctional ligand source. In addition, the complexes may also be prepared by means of an amide elimination and hydrocarbylation process starting from the corresponding Group 4 metal tetraamide and a hydrocarbylating agent, such as trimethylaluminum. Other techniques may be used as well. These complexes are known from the disclosures of, among others, U.S. Pat. Nos. 6,320,005, 6,103,657, and 6,953,764 and International Publication Nos WO 02/38628, and WO 03/40195.

Suitable co-catalysts are those disclosed in WO2005/090426, in particular, those disclosed on page 54, line 1 to page 60, line 12, which is herein incorporated by reference.

Suitable chain shuttling agents are those disclosed in WO2005/090426, in particular, those disclosed on page 19, line 21 through page 20 line 12, which is herein incorporated by reference. Particularly preferred chain shuttling agents are dialkyl zinc compounds.

Block Composite Polymer Product

Utilizing the present process, novel block composite polymers are readily prepared. Preferably, the block composite polymers comprise propylene, 1-butene or 4-methyl-1-pentene and one or more comonomers. Preferably, the block polymers of the block composites comprise in polymerized form propylene and ethylene and/or one or more $C_{4-20}$ α-olefin comonomers, and/or one or more additional copolymerizable comonomers or they comprise 4-methyl-1-pentene and ethylene and/or one or more $C_{4-20}$ α-olefin comonomers, or they comprise 1-butene and ethylene, propylene and/or one or more $C_5$-$C_{20}$ α-olefin comonomers and/or one or more additional copolymerizable comonomers. Additional suitable comonomers are selected from diolefins, cyclic olefins, and cyclic diolefins, halogenated vinyl compounds, and vinylidene aromatic compounds.

Comonomer content in the resulting block composite polymers may be measured using any suitable technique, with techniques based on nuclear magnetic resonance (NMR) spectroscopy preferred. It is highly desirable that some or all of the polymer blocks comprise amorphous or relatively amorphous polymers such as copolymers of propylene, 1-butene or 4-methyl-1-pentene and a comonomer, especially random copolymers of propylene, 1-butene or 4-methyl-1-pentene with ethylene, and any remaining polymer blocks (hard segments), if any, predominantly comprise propylene, 1-butene or 4-methyl-1-pentene in polymerized form. Preferably such segments are highly crystalline or stereospecific polypropylene, polybutene or poly-4-methyl-1-pentene, especially isotactic homopolymers.

Further preferably, the block copolymers of the invention comprise from 10 to 90 percent crystalline or relatively hard segments and 90 to 10 percent amorphous or relatively amorphous segments (soft segments). Within the soft segments, the mole percent comonomer may range from 5 to 90 mole percent, preferably from 10 to 60 mole percent. In the case wherein the comonomer is ethylene, it is preferably present in an amount of 10 wt % to 75 wt %, more preferably from 30 wt % to 70 wt %.

Preferably, the copolymers comprise hard segments that are 80 wt % to 100 wt % propylene. The hard segments can be greater than 90 wt %, preferably greater than 95 wt % and more preferably greater than 98 wt % propylene.

The block composite polymers of the invention may be differentiated from conventional, random copolymers, physical blends of polymers, and block copolymers prepared via sequential monomer addition. The block composites may be differentiated from random copolymers by characteristics such as higher melting temperatures for a comparable amount of comonomer, block composite index, as described below; from a physical blend by characteristics such as block composite index, better tensile strength, improved fracture strength, finer morphology, improved optics, and greater impact strength at lower temperature; from block copolymers prepared by sequential monomer addition by molecular weight distribution, rheology, shear thinning, rheology ratio, and in that there is block polydispersity.

In some embodiments, the block composites of the invention have a Block Composite Index (BCI), as defined below, that is greater than zero but less than about 0.4 or from about 0.1 to about 0.3. In other embodiments, BCI is greater than about 0.4 and up to about 1.0. Additionally, the BCI can be in the range of from about 0.4 to about 0.7, from about 0.5 to about 0.7, or from about 0.6 to about 0.9. In some embodiments, BCI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, BCI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

The block composites preferably have a Tm greater than 100° C., preferably greater than 120° C., and more preferably greater than 125° C. Preferably the MFR (230° C., 2.16 kg) of the block composite is from 0.1 to 1000 dg/min, more preferably from 0.1 to 50 dg/min and more preferably from 0.1 to 30 dg/min and may also be 1 to 10 dg/min.

Other desirable compositions according to the present invention are elastomeric block copolymers of propylene, 1-butene or 4-methyl-1-pentene with ethylene, and optionally one or more α-olefins or diene monomers. Preferred α-olefins for use in this embodiment of the present invention are designated by the formula $CH_2$=$CHR^*$, where $R^*$ is a linear or branched alkyl group of from 1 to 12 carbon atoms. Examples of suitable α-olefins include, but are not limited to isobutylene, 1-butene, 1-pentene, 1-hexene, 4-methyl-1-pentene (when copolymerized with propylene), and 1-octene. Suitable dienes for use in preparing such polymers, especially multi-block EPDM type polymers include conjugated or non-conjugated, straight or branched chain-, cyclic- or polycyclic-dienes containing from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene. The resulting product may comprise isotactic homopolymer segments alternating with elastomeric copolymer segments, made in situ during the polymerization. Preferably, the product may be comprised solely of the elastomeric block copolymer of propylene, 1-butene or 4-methyl-1-pentene with one or more comonomers, especially ethylene.

Because the diene containing polymers contain alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

Further preferably, the block composites of this embodiment of the invention have a weight average molecular weight (Mw) from 10,000 to about 2,500,000, preferably from 35000 to about 1,000,000 and more preferably from 50,000 to about 300,000, preferably from 50,000 to about 200,000.

The polymers of the invention may be oil extended with from 5 to about 95 percent, preferably from 10 to 60 percent, more preferably from 20 to 50 percent, based on total composition weight, of a processing oil. Suitable oils include any oil that is conventionally used in manufacturing extended EPDM rubber formulations. Examples include both naphthenic- and paraffinic-oils, with paraffinic oils being preferred.

Any cross-linking agent which is capable of curing an EPDM can be used in embodiments of the invention. Suitable curing agents include, but are not limited to, phenolic resin, peroxides, azides, aldehyde-amine reaction products, vinyl silane grafted moieties, hydrosilylation, substituted ureas, substituted guanidines; substituted xanthates; substituted dithiocarbamates; sulfur-containing compounds, such as thiazoles, imidazoles, sulfenamides, thiuramidisulfides, paraquinonedioxime, dibenzoparaquinonedioxime, sulfur; and combinations thereof. Suitable cross-linking agents may also be used such as those disclosed in U.S. Pat. No. 7,579,408, col. 31, line 54 through col. 34, line 52, which disclosure is herein incorporated by reference.

An elastomer composition according to this embodiment of the invention may include carbon black. Preferably, the carbon black is present in the amount of from 10 to 80 percent, more preferably from 20 to 60 percent, based on total composition weight.

Additional components of the present formulations usefully employed according to the present invention include various other ingredients in amounts that do not detract from the properties of the resultant composition. These ingredients include, but are not limited to, activators such as calcium or magnesium oxide; fatty acids such as stearic acid and salts thereof; fillers and reinforcers such as calcium or magnesium carbonate, silica, and aluminum silicates; plasticizers such as dialkyl esters of dicarboxylic acids; antidegradants; softeners; waxes; and pigments.

Polymerization Methods

Suitable processes useful in producing the block composites of the invention may be found, for example, in US Patent Application Publication No. 2008/0269412, published on Oct. 30, 2008, which is herein incorporated by reference. In particular, the polymerization is desirably carried out as a continuous polymerization, preferably a continuous, solution polymerization, in which catalyst components, monomers, and optionally solvent, adjuvants, scavengers, and polymerization aids are continuously supplied to one or more reactors or zones and polymer product continuously removed therefrom. Within the scope of the terms "continuous" and "continuously" as used in this context are those processes in which there are intermittent additions of reactants and removal of products at small regular or irregular intervals, so that, over time, the overall process is substantially continuous. Moreover, as previously explained, the chain shuttling agent(s) may be added at any point during the polymerization including in the first reactor or zone, at the exit or slightly before the exit of the first reactor, between the first reactor or zone and the second or any subsequent reactor or zone, or even solely to the second or any subsequent reactor or zone. Due to the difference in monomers, temperatures, pressures or other difference in polymerization conditions between at least two of the reactors or zones connected in series, polymer segments of differing composition such as comonomer content, crystallinity, density, tacticity, regio-regularity, or other chemical or physical difference, within the same molecule are formed in the different reactors or zones. The size of each segment or block is determined by continuous polymer reaction conditions, and preferably is a most probable distribution of polymer sizes.

Each reactor in the series can be operated under high pressure, solution, slurry, or gas phase polymerization conditions. In a multiple zone polymerization, all zones operate under the same type of polymerization, such as solution, slurry, or gas phase, but at different process conditions. For a solution polymerization process, it is desirable to employ homogeneous dispersions of the catalyst components in a liquid diluent in which the polymer is soluble under the polymerization conditions employed. One such process utilizing an extremely fine silica or similar dispersing agent to produce such a homogeneous catalyst dispersion wherein normally either the metal complex or the cocatalyst is only poorly soluble is disclosed in U.S. Pat. No. 5,783,512. A high pressure process is usually carried out at temperatures from 100° C. to 400° C. and at pressures above 500 bar (50 MPa). A slurry process typically uses an inert hydrocarbon diluent and temperatures of from 0° C. up to a temperature just below the temperature at which the resulting polymer becomes substantially soluble in the inert polymerization medium. Preferred temperatures in a slurry polymerization are from 30° C., preferably from 60° C. up to 115° C., preferably up to 100° C. Pressures typically range from atmospheric (100 kPa) to 500 psi (3.4 MPa).

In all of the foregoing processes, continuous or substantially continuous polymerization conditions are preferably employed. The use of such polymerization conditions, especially continuous, solution polymerization processes, allows the use of elevated reactor temperatures which results in the economical production of the present block copolymers in high yields and efficiencies.

The catalyst may be prepared as a homogeneous composition by addition of the requisite metal complex or multiple complexes to a solvent in which the polymerization will be conducted or in a diluent compatible with the ultimate reaction mixture. The desired cocatalyst or activator and, optionally, the shuttling agent may be combined with the catalyst composition either prior to, simultaneously with, or after combination of the catalyst with the monomers to be polymerized and any additional reaction diluent.

At all times, the individual ingredients as well as any active catalyst composition must be protected from oxygen, moisture and other catalyst poisons. Therefore, the catalyst components, shuttling agent and activated catalysts must be prepared and stored in an oxygen and moisture free atmosphere, preferably under a dry, inert gas such as nitrogen.

Without limiting in any way the scope of the invention, one means for carrying out such a polymerization process is as follows. In one or more well stirred tank or loop reactors operating under solution polymerization conditions, the monomers to be polymerized are introduced continuously together with any solvent or diluent at one part of the reactor. The reactor contains a relatively homogeneous liquid phase composed substantially of monomers together with any solvent or diluent and dissolved polymer. Preferred solvents include $C_{4-10}$ hydrocarbons or mixtures thereof, especially alkanes such as hexane or mixtures of alkanes, as well as one or more of the monomers employed in the polymerization. Examples of suitable loop reactors and a variety of suitable operating conditions for use therewith, including the use of multiple loop reactors, operating in series, are found in U.S. Pat. Nos. 5,977,251, 6,319,989 and 6,683,149.

Catalyst along with cocatalyst and optionally chain shuttling agent are continuously or intermittently introduced in the reactor liquid phase or any recycled portion thereof at a minimum of one location. The reactor temperature and pressure may be controlled by adjusting the solvent/monomer ratio, the catalyst addition rate, as well as by use of cooling or heating coils, jackets or both. The polymerization rate is controlled by the rate of catalyst addition. The content of a given monomer in the polymer product is influenced by the ratio of monomers in the reactor, which is controlled by manipulating the respective feed rates of these components to the reactor. The polymer product molecular weight is controlled, optionally, by controlling other polymerization variables such as the temperature, monomer concentration, or by the previously mentioned chain shuttling agent, or a chain terminating agent such as hydrogen, as is well known in the art. Connected to the discharge of the reactor, optionally by means of a conduit or other transfer means, is a second reactor, such that the reaction mixture prepared in the first reactor is discharged to the second reactor without substantially termination of polymer growth. Between the first and second reactors, a differential in at least one process condition is established. Preferably for use in formation of a copolymer of two or more monomers, the difference is the presence or absence of one or more comonomers or a difference in comonomer concentration. Additional reactors, each arranged in a manner similar to the second reactor in the series may be provided as well. Upon exiting the last reactor of the series, the effluent is contacted with a catalyst kill agent such as water, stream or an alcohol or with a coupling agent.

The resulting polymer product is recovered by flashing off volatile components of the reaction mixture such as residual monomers or diluent at reduced pressure, and, if necessary, conducting further devolatilization in equipment such as a devolatilizing extruder. In a continuous process the mean residence time of the catalyst and polymer in the reactor generally is from 5 minutes to 8 hours, and preferably from 10 minutes to 6 hours.

Alternatively, the foregoing polymerization may be carried out in a plug flow reactor with a monomer, catalyst, shuttling agent, temperature or other gradient established between differing zones or regions thereof, optionally accompanied by separated addition of catalysts and/or chain shuttling agent, and operating under adiabatic or non-adiabatic polymerization conditions.

The catalyst composition may also be prepared and employed as a heterogeneous catalyst by adsorbing the requisite components on an inert inorganic or organic particulated solid, as previously disclosed. In a preferred embodiment, a heterogeneous catalyst is prepared by co-precipitating the metal complex and the reaction product of an inert inorganic compound and an active hydrogen containing activator, especially the reaction product of a tri ($C_{1-4}$ alkyl) aluminum compound and an ammonium salt of a hydroxyaryltris(pentafluorophenyl)borate, such as an ammonium salt of (4-hydroxy-3,5-ditertiarybutylphenyl)tris(pentafluorophenyl)borate. When prepared in heterogeneous or supported form, the catalyst composition may be employed in a slurry or a gas phase polymerization. As a practical limitation, slurry polymerization takes place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. As with a solution polymerization, the α-olefin comonomer or a mixture of different α-olefin monomers may be used in whole or part as the diluent. Most preferably at least a major part of the diluent comprises the α-olefin monomer or monomers to be polymerized.

TPV Compositions

The TPV compositions comprise at least a thermoplastic polymer as the matrix phase. Suitable thermoplastic polymer include, but are not limited to, polyethylene, polypropylene, polycarbonate, olefin block copolymers, block composites, polystyrene, polyethylene terephthalate, nylon, branched polyethylene (such as high density polyethylene), branched polypropylene, branched polycarbonate, branched polystyrene, branched polyethylene terephthalate, and branched nylon. While other thermoplastic polymers can be used, thermoplastic polyolefins, are preferred. Further suitable thermoplastic polyolefins are those disclosed, for example, in U.S. Pat. No. 7,579,408, col. 25, line 4 through Col. 28, line 28, which disclosure is herein incorporated by reference.

The TPV compositions also comprise at least a vulcanizable elastomer. Any vulcanizable elastomer may be used to form a TPV, provided that it can be cross-linked (i.e., vulcanized) by a cross-linking agent. Vulcanizable elastomers, although thermoplastic in the uncured state, are normally classified as thermosets because they undergo an irreversible process of thermosetting to an unprocessable state. Preferred vulcanizable elastomers are those such as disclosed in U.S. Pat. No. 7,579,408, col. 29, line 61 through col. 31, line 40, which disclosure is herein incorporated by reference. Particularly preferred vulcanizable elastomers are EPDM, ethylene/α-olefins, olefin block copolymers and may also be block composites as defined herein.

Any cross-linking agent which is capable of curing an elastomer, preferably without substantially degrading and/or curing the thermoplastic polymer used in a TPV, can be used in embodiments of the invention. A preferred cross-linking agent is phenolic resin. Other curing agents include, but are not limited to, peroxides, azides, aldehyde-amine reaction products, vinyl silane grafted moieties, hydrosilylation, substituted ureas, substituted guanidines; substituted xanthates; substituted dithiocarbamates; sulfur-containing compounds, such as thiazoles, imidazoles, sulfenamides, thiuramidisulfides, paraquinonedioxime, dibenzoparaquinonedioxime, sulfur; and combinations thereof. Suitable cross-linking agents may also be used such as those disclosed in U.S. Pat. No. 7,579,408, col. 31, line 54 through col. 34, line 52, which disclosure is herein incorporated by reference.

The properties of a TPV may be modified, either before or after vulcanization, by addition of ingredients which are conventional in the compounding of EPDM rubber, thermoplastic polymer resin and blends thereof. Examples of such ingredients include particulate filler such as carbon black, amorphous precipitated or fumed silica, titanium dioxide, colored pigments, clay, talc, calcium carbonate, wollastonite, mica, montmorillonite, glass beads, hollow glass spheres, glass fibers, zinc oxide and stearic acid, stabilizers, antidegradants, flame retardants, processing aids, adhesives, tackifiers, plasticizers, wax, discontinuous fibers, such as wood cellulose fibers and extender oils. Further additives are those such as disclosed in U.S. Pat. No. 7,579,408, col. 34, line 54 through col. 35, line 39, which disclosure is herein incorporated by reference.

Thermoplastic vulcanizates are typically prepared by blending plastic and cured rubbers by dynamic vulcanization. The compositions can be prepared by any suitable method for mixing of rubbery polymers including mixing on a rubber mill or in internal mixers such as a Banbury mixer. Further details on suitable methods are those such as disclosed in U.S.

Pat. No. 7,579,408, col. 35, line 40 through col. 39, line 16, which disclosure is herein incorporated by reference.

Thermoplastic vulcanizate compositions are useful for making a variety of articles such as tires, hoses, belts, gaskets, moldings and molded parts. They are particularly useful for applications that require high melt strength such as large part blow molding, foams, and wire cables. They also are useful for modifying thermoplastic resins, in particular, thermoplastic polymer resins. Additional TPV applications are disclosed in U.S. Pat. No. 7,579,408, col. 39, line 25 through col. 40, line 45, which disclosure is herein incorporated by reference.

Test Methods

The overall composition of each resin is determined by DSC, NMR, GPC, DMS, and TEM morphology. Xylene fractionation is further used to estimate the yield of block copolymer.

Differential Scanning Calorimetry (DSC)

Differential Scanning Calorimetry is performed on a TA Instruments Q1000 DSC equipped with an RCS cooling accessory and an auto sampler. A nitrogen purge gas flow of 50 ml/min is used. The sample is pressed into a thin film and melted in the press at about 190° C. and then air-cooled to room temperature (25° C.). About 3-10 mg of material is then cut, accurately weighed, and placed in a light aluminum pan (ca 50 mg) which is later crimped shut. The thermal behavior of the sample is investigated with the following temperature profile: the sample is rapidly heated to 190° C. and held isothermal for 3 minutes in order to remove any previous thermal history. The sample is then cooled to −90° C. at 10° C./min cooling rate and held at −90° C. for 3 minutes. The sample is then heated to 150° C. at 10° C./min heating rate. The cooling and second heating curves are recorded.

$^{13}$C Nuclear Magnetic Resonance (NMR)

Sample Preparation

The samples are prepared by adding approximately 2.7 g of a 50/50 mixture of tetrachloroethane-d2/orthodichlorobenzene that is 0.025M in chromium acetylacetonate (relaxation agent) to 0.21 g sample in a 10 mm NMR tube. The samples are dissolved and homogenized by heating the tube and its contents to 150° C.

Data Acquisition Parameters

The data is collected using a Bruker 400 MHz spectrometer equipped with a Bruker Dual DUL high-temperature Cryo-Probe. The data is acquired using 320 transients per data file, a 7.3 sec pulse repetition delay (6 sec delay+1.3 sec acq. time), 90 degree flip angles, and inverse gated decoupling with a sample temperature of 125° C. All measurements are made on non spinning samples in locked mode. Samples are homogenized immediately prior to insertion into the heated (130° C.) NMR Sample changer, and are allowed to thermally equilibrate in the probe for 15 minutes prior to data acquisition.

Gel Permeation Chromatography (GPC)

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)): $M_{polypropylene}=0.645(M_{polystyrene})$.

Polypropylene equivalent molecular weight calculations are performed using Viscotek TriSEC software Version 3.0.

Fast-Temperature Rising Elution Fractionation (F-TREF)

In F-TREF analysis, the composition to be analyzed is dissolved in ortho-dichlorobenzene and allowed to crystallize in a column containing an inert support (stainless steel shot) by slowly reducing the temperature to 30° C. (at a preferred rate of 0.4° C./min). The column is equipped with an infra-red detector. An F-TREF chromatogram curve is then generated by eluting the crystallized polymer sample from the column by slowly increasing the temperature of the eluting solvent (o-dichlorobenzene) from 30 to 140° C. (at a preferred rate of 1.5° C./min).

High Temperature Liquid Chromatography (HTLC)

HTLC is performed according to the methods disclosed in US Patent Application Publication No. 2010-0093964 and U.S. patent application Ser. No. 12/643,111, filed Dec. 21, 2009, both of which are herein incorporated by reference. Samples are analyzed by the methodology described below.

A Waters GPCV2000 high temperature SEC chromatograph was reconfigured to build the HT-2DLC instrumentation. Two Shimadzu LC-20AD pumps were connected to the injector valve in GPCV2000 through a binary mixer. The first dimension (D1) HPLC column was connected between the injector and a 10-port switch valve (Valco Inc). The second dimension (D2) SEC column was connected between the 10-port valve and LS (Varian Inc.), IR (concentration and composition), RI (refractive index), and IV (intrinsic viscosity) detectors. RI and IV were built-in detector in GPCV2000. The IRS detector was provided by PolymerChar, Valencia, Spain.

Columns: The D1 column was a high temperature Hypercarb graphite column (2.1×100 mm) purchased from Thermo Scientific. The D2 column was a PLRapid-H column purchased from Varian (10×100 mm).

Reagents: HPLC grade trichlorobenzene (TCB) was purchased from Fisher Scientific. 1-Decanol and decane were from Aldrich. 2,6-Di-tert-butyl-4-methylphenol (Ionol) was also purchased from Aldrich.

Sample Preparation: 0.01-0.15 g of polyolefin sample was placed in a 10-mL Waters autosampler vial. 7-mL of either 1-decanol or decane with 200 ppm Ionol was added to the vial afterwards. After sparging helium to the sample vial for about 1 min, the sample vial was put on a heated shaker with temperature set at 160° C. The dissolution was done by shaking the vial at the temperature for 2 hr. The vial was then transferred to the autosampler for injection. Please note that the actual volume of the solution was more than 7 mL due to the thermal expansion of the solvent.

HT-2DLC: The D1 flow rate was at 0.01 mL/min. The composition of the mobile phase was 100% of the weak eluent (1-decanol or decane) for the first 10 min of the run. The composition was then increased to 60% of strong eluent (TCB) in 489 min. The data were collected for 489 min as the duration of the raw chromatogram. The 10-port valve switched every three minutes yielding 489/3=163 SEC chromatograms. A post-run gradient was used after the 489 min data acquisition time to clean and equilibrate the column for the next run:

Clean Step:
1. 490 min: flow=0.01 min; // Maintain the constant flow rate of 0.01 mL/min from 0-490 min.
2. 491 min: flow=0.20 min; // Increase the flow rate to 0.20 mL/min.
3. 492 min: % B=100; // Increase the mobile phase composition to 100% TCB
4. 502 min: % B=100; // Wash the column using 2 mL of TCB Equilibrium Step:
5. 503 min: % B=0; // Change the mobile phase composition to 100% of 1-decanol or decane
6. 513 min: % B=0; // Equilibrate the column using 2 mL of weak eluent
7. 514 min: flow=0.2 mL/min; // Maintain the constant flow of 0.2 mL/min from 491-514 min
8. 515 min: flow=0.01 mL/min; // Lower the flow rate to 0.01 mL/min.

After step 8, the flow rate and mobile phase composition were the same as the initial conditions of the run gradient. The D2 flow rate was at 2.51 mL/min. Two 60 μL loops were installed on the 10-port switch valve. 30-μL of the eluent from D1 column was loaded onto the SEC column with every switch of the valve. The IR, LS15 (light scattering signal at 15°), LS90 (light scattering signal at 90°), and IV (intrinsic viscosity) signals were collected by EZChrom through a SS420X analogue-to-digital conversion box. The chromatograms were exported in ASCII format and imported into a home-written MATLAB software for data reduction. Using an appropriate calibration curve of polymer composition and retention volume, of polymers that are of similar nature of the hard block and soft block contained in the block composite being analyzed. Calibration polymers should be narrow in composition (both molecular weight and chemical composition) and span a reasonable molecular weight range to cover the composition of interest during the analysis. Analysis of the raw data was calculated as follows, the first dimension HPLC chromatogram was reconstructed by plotting the IR signal of every cut (from total IR SEC chromatogram of the cut) as a function of the elution volume. The IR vs. D1 elution volume was normalized by total IR signal to obtain weight fraction vs. D1 elution volume plot. The IR methyl/measure ratio was obtained from the reconstructed IR measure and IR methyl chromatograms. The ratio was converted to composition using a calibration curve of PP wt. % (by NMR) vs. methyl/measure obtained from SEC experiments. The MW was obtained from the reconstructed IR measure and LS chromatograms. The ratio was converted to MW after calibration of both IR and LS detectors using a PE standard. The weight % of isolated PP is measured as the area that corresponds to the hard block composition based on the isolated peak and the retention volume as determined by a composition calibration curve.

Dynamic Mechanical Spectroscopy (DMS)

The dynamic mechanical measurements (loss and storage modulus vs. temperature) are measured on TA instruments ARES. The dynamic modulus measurements are performed in torsion on a solid bar of ca. 2 mm thickness, 5 mm wide and ca. 10 mm in length. The data is recorded at a constant frequency of 10 rad/s and at a heating/cooling rate of 5° C./min. The temperature sweeps are performed from −50 to 190 C at 5° C./min.

Transmission Electron Microscopy

Polymer films are prepared by compression molding followed by fast quenching. The polymer is pre-melted at 190° C. for 1 minute at 1000 psi and then pressed for 2 minutes at 5000 psi and then quenched between chilled platens (15-20° C.) for 2 minutes.

The compression molded films are trimmed so that sections could be collected near the core of the films. The trimmed samples are cryopolished prior to staining by removing sections from the blocks at −60° C. to prevent smearing of the elastomer phases. The cryo-polished blocks are stained with the vapor phase of a 2% aqueous ruthenium tetraoxide solution for 3 hrs at ambient temperature. The staining solution is prepared by weighing 0.2 gm of ruthenium (III) chloride hydrate ($RuCl_3 \times H_2O$) into a glass bottle with a screw lid and adding 10 ml of 5.25% aqueous sodium hypochlorite to the jar. The samples are placed in the glass jar using a glass slide having double sided tape. The slide is placed in the bottle in order to suspend the blocks about 1 inch above the staining solution. Sections of approximately 90 nanometers in thickness are collected at ambient temperature using a diamond knife on a Leica EM UC6 microtome and placed on 600 mesh virgin TEM grids for observation.

Image Collection—TEM images are collected on a JEOL JEM-1230 operated at 100 kV accelerating voltage and collected on a Gatan-791 and 794 digital cameras.

Xylene Soluble Fractionation Analysis

A weighed amount of resin is dissolved in 200 ml o-xylene under reflux conditions for 2 hours. The solution is then cooled in a temperature controlled water bath to 25° C. to allow the crystallization of the xylene insoluble (XI) fraction. Once the solution is cooled and the insoluble fraction precipitates from the solution, the separation of the xylene soluble (XS) fraction from the xylene insoluble fraction is done by filtration through a filter paper. The remaining o-xylene solution is evaporated from the filtrate. Both XS and XI fractions are dried in a vacuum oven at 100° C. for 60 min and then weighed. Alternatively, if the solution crystallization temperature of the soft block polymer is above room temperature, the fractionation step can be carried out at a temperature 10-20° C. above the soft blocks crystallization temperature but below the hard blocks crystallization temperature. The temperature of separation can be determined by TREF or CRYSTAF measurement as described by reference, TREF and CRYSTAF technologies for Polymer Characterization, Encyclopedia of Analytical Chemistry. 2000 Issue, Pages 8074-8094. This fractionation can be carried out in a laboratory heated dissolution and filtration apparatus or a fractionation instrument such as the Preparatory mc$^g$ (available from Polymer Char, Valencia, Spain).

Melt Index and Melt Flow Rate:

Melt Index, or $I_2$ is measured in grams per 10 minutes, is done in accordance with ASTM D 1238, condition 190° C./2.16 kg. The MFR of the PP resins is measured in accordance to ASTM D 1238, condition 230° C./2.16 kg.

Shore A Hardness

Shore A hardness is carried out according to ASTM D 2240.

Compression Set:

Compression set is measured according to ASTM D 395 at 70° C.

Tensile Properties:

Tensile strength and ultimate elongation are carried out according to ASTM D-412.

Atomic Force Microscopy (AFM)

Samples are polished under cryogenic conditions using a Leica UCT/FCS microtome operated at −120° C. Some thin sections (about 160 nm) are cut from the sample and placed on the mica surface for AFM analysis. Topography and phase images are captured at ambient temperature by using a Digital Instruments (now Veeco) Multi-Mode AFM equipped with a NanoScope IV controller. Nano-sensor probes with a spring constant of 55 N/m and a resonant frequency in the vicinity of 167 kHz are used for phase imaging. The samples are imaged at a frequency of 0.5-2 Hz and a set point ratio of ~0.8.

Test Methods for TPV Compositions

Gel Content

Gel content is measured by small scale Soxhlet extraction method. Samples are cut into small pieces ranging from about 35 mg to 86 mg. Three pieces of each sample are individually weighed to 4-place accuracy on a top-loading electronic analytical balance. Each piece is placed inside a small cylinder composed of aluminum window screen. The ends of the cylinders are closed with ordinary paper staples. Six aluminum cylinders are placed inside one fritted glass extraction thimble. The thimbles are placed in jacketed Soxhlet extractors and extracted overnight with refluxing xylenes. At the end of the minimum 12 hour extraction, the still warm thimbles are quenched in methanol. The methanol precipitates the gel and makes it easier to remove the gels intact from the cylinders. The cylinders containing precipitated gels are purged briefly with nitrogen to drive off free methanol. The gels are removed from the aluminum cylinders with forceps and placed on aluminum weighing pans. The pans with gels are vacuum dried for 1 hour at 125° C. The dried, cool gels are removed from aluminum weighing pans and weighed directly on the top-loading analytical balance. The dry extracted gel weight is divided by the starting weight to give the percent gel content.

Atomic Force Microscopy (AFM)

Samples are polished under cryogenic conditions using a Leica UCT/FCS microtome operated at −120° C. Thin sections (about 160 nm) are cut from sample and placed on a mica surface for AFM analysis. Topography and phase images are captured at ambient temperature by using a Digital Instruments (now Veeco) Multi-Mode AFM equipped with a NanoScope IV controller. Nano-sensor probes with a spring constant 55 N/m and a resonant frequency in the vicinity of 167 kHz are used for phase imaging. The samples are imaged at a frequency of 0.5-2 Hz and a set point ratio of ~0.8

Differential Scanning Calorimetry (DSC)

Differential scanning Calorimetry (DSC) is performed on a TA Instruments Q100 DSC V9.8 Build 296 using Universal V3.7A analysis software from TA Instruments. Samples are rapidly heated to 230° C. and held isothermally for 3 minutes in order to remove any previous heat history. The sample are then cooled to −90° C. at 10° C./minute cooling rate and held at −90° C. for 3 minutes. The samples are then heated to 230° C. at 10° C./minute heating rate. The first cooling and second heating curves are recorded.

Dynamic Mechanical Spectroscopy (DMS)

Constant temperature dynamic frequency sweeps in the frequency range of 0.1 to 100 rad/s are performed under nitrogen purge using a TA Instruments Advanced Rheometric Expansion System (ARES) equipped with 25 mm parallel plates. TPO or TPV samples are die cut from compression or injection-molded plaques into 3 mm thick×1 inch diameter circular specimens. The sample is placed on the plate and allowed to melt for 5 minutes. The plates are then closed to 2.1 mm, the sample trimmed, and the gap closed to 2.0 mm before starting the test. The method has an additional 5 minute delay built-in to allow for temperature equilibration. Both TPO and TPV samples are measured at 230° C. The strain amplitude is held constant at 10%. The stress response is reported as the storage moduli (G'), loss moduli (G") and the complex viscosity ($\eta^*$)

Dynamic Mechanical Thermal Analysis (DMTA)

The solid state dynamic mechanical properties of the materials are measured on a Rheometric Dynamic Analyzer (RDA III) in torsional-rectangular mode on a rectangular bar. Specimens with 3 mm thickness and 12.5 mm width are die cut from compression or injection-molded plaques. The initial gap is set to 10 mm for all samples. The temperature is varied from −100° C. to 200° C. at a rate of 5° C./min, and the storage moduli (G'), loss moduli (G") are monitored at a constant rate of 10 rad/s. As the sample expanded during heating, the gap is adapted to minimize the normal load on the sample. The strain amplitude is allowed to vary from 0.05% at low temperature to 4% at high temperature.

Shore A Hardness

Hardness measurements are taken with a Shore A type durometer. The durometer is placed onto a plaque of ~3 mm thickness, prepared by compression or injection molding.

Compression Set

Compression set is measured according to ASTM D 395 at 70° C. and 120° C. Pucks of 29.mm (±0.5 mm) are extracted from the compression or injection molded plaques of ~3 mm thickness. For each sample, four pucks are inspected for notches, uneven thickness and inhomogeneity, and are stacked such that the total height is 12.5 mm (±0.5 mm), equating to compressive strain of 25%. Compression set is performed on two specimens for each sample at the two temperatures.

The stacked pucks are placed in the compressive device and locked into place; the apparatus is then placed at the appropriate temperature for specified time (22 hrs for 70° C. and 72 hrs for 120° C.). In this test the stress is released at the test temperature and the thickness of the sample is measured after a 30 min. equilibration period at room temperature.

Compression set is a measure of the degree of recovery of a sample following compression and is calculated according to the equation $CS=(H_0-H_2)/(H_0-H_1)$; where $H_0$ is the original thickness of the sample, $H_1$ is the thickness of the spacer bar used and $H_2$ is the final thickness of the sample after removal of the compressive force.

Stress-Strain Properties

Tensile properties are measured at room temperature following ASTM D-412, on micro-tensile specimens that are die cut from the same compression or injection molded plaques in the mill direction. The tensile strain is calculated from the ratio of the increment of the length between clamps to the initial gauge length. The tensile stress is determined from dividing the tensile load by the initial cross section of the sample.

Table A lists a summary of all characterization methods used in this study and specific conditions.

TABLE A

Summary of characterization methods and conditions

| Test and Description | ASTM # | Test Condition |
|---|---|---|
| Gel Content | / | 12 hours in boiling xylene |
| Shore A Hardness | D2240 | 10 s delay |
| Tensile Properties* | D1708 | Microtensiles--Die 84 |
| Compression Set | D395B | 25% strain, 22 hrs @ 70° C. |
|  |  | 25% strain, 70 hrs @ 120° C. |
| DSC | / | −90° C. to 230° C. |
| DMS | D3838 | 230° C. |
| DMTA | E313-73, D1925-70 | 0.05% to 0.4% strain |
| AFM | / | Tapping mode |
| TEM | / | Back scattering |

*All tensile bars are cut (and thus pulled) in the mill direction

EXAMPLES

Examples

General

Catalyst-1 ([[rel-2',2'''-[(1R,2R)-1,2-cylcohexanediylbis(methyleneoxy-κO)]bis[3-(9H-carbazol-9-yl)-5-methyl[1,1'-biphenyl]-2-olato-κO]](2-)]dimethyl-hafnium) and cocatalyst-1 a mixture of methyldi($C_{14-18}$ alkyl)ammonium salts of tetrakis(pentafluorophenyl)borate, prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,9883, Ex. 2., are purchased from Boulder Scientific and used without further purification. CSA-1 (diethylzinc or DEZ) and modified methylalumoxane (MMAO) were purchased from Akzo Nobel and used without further purification. The solvent for the polymerization reactions is a hydrocarbon mixture (SBP 100/140) obtainable from Shell Chemical Company and purified through beds of 13-X molecular sieves prior to use.

All examples except A1, E1, U1 and Y1 have an iPP hard block. Runs B through D have a semi-crystalline, ethylene-propylene soft block containing 60-65 wt % C2 while runs F through H have an amorphous, ethylene-propylene soft block containing 40 wt % C2. With increasing alphabetical letter, the weight fraction and length of the iPP hard block is independently controlled from 30 to 60 weight percent by increasing the production rate in the reactor (in this case, reactor 2).

Examples V1, W1, X1 and Y1, Z1, AA are similar in design to B, C, D but made at different reactor conditions. The effect of higher propylene conversion and reactor temperature will be discussed later.

All examples are run with no hydrogen. The CSA concentration in Reactor 1 for all examples is 153 mmol/kg. The MMAO concentration in Reactor 2 for all examples is 6 mmol/kg.

Samples A1-D1

Inventive propylene/ethylene copolymers were prepared using two continuous stirred tank reactors (CSTR) connected in series. Each reactor is hydraulically full and set to operate at steady state conditions. Sample A1 is prepared by flowing monomers, solvent, catalyst-1, cocatalyst-1, and CSA-1 to the first reactor according to the process conditions outlined in Table 1. To prepare sample B1, the first reactor contents as described in Table 1A were flowed to a second reactor in series. Additional catalyst-1 and cocatalyst-1 were added to the second reactor, as well as a small amount of MMAO as a scavenger. Samples C1 and D1 were prepared by controlling the conditions of the two reactors as described in Table 1A and 1B.

Samples E1-AB1

Each set of diblock samples F1-H1, V1-X1, Y1-AB1 were prepared as above for examples B1-D1 but according to the process conditions outlined in Table 1A and 1B. For each set, a first reactor product (E1, U1, Y1) is prepared targeting the first block composition.

TABLE 1A

First reactor process conditions to produce diblock copolymers B1-D1, F1-H1, V1-X1, Z1-AB1.

| Example | Solvent feed (kg/hr) | Propylene feed (kg/hr) | Ethylene feed (Kg/Hr) | Temp ° C. | Catalyst conc (mmol/Kg) | Catalyst sol. flow (g/hr) | Cocatalyst conc. (mmol/kg) | Cocatalyst sol. Flow (g/hr) | CSA flow (g/hr) | C3 conversion (%) | Calculated split (%) | Efficiency (gPoly/gM)*10$^{-6}$ |
|---|---|---|---|---|---|---|---|---|---|---|---|---|
| A1§ | 25 | 0.87 | 1.4 | 90 | 0.3 | 47 | 0.36 | 47 | 230 | 91 | 100 | 0.79 |
| B1 | 25 | 0.87 | 1.4 | 90 | 0.3 | 43 | 0.36 | 43 | 222 | 91 | 66.6 | 0.87 |
| C1 | 25 | 0.87 | 1.4 | 90 | 0.3 | 40 | 0.36 | 40 | 222 | 90 | 50 | 0.93 |
| D1 | 17.5 | 0.65 | 1.05 | 90 | 0.3 | 22 | 0.36 | 22 | 165 | 90 | 40 | 1.27 |
| E1§ | 14 | 1.06 | 0.65 | 90 | 0.3 | 14 | 0.36 | 24 | 120 | 90 | 100 | 2.00 |
| F1 | 14 | 1.06 | 0.65 | 91 | 0.3 | 16 | 0.36 | 25 | 120 | 90 | 66.6 | 1.75 |
| G1 | 14 | 1.06 | 0.65 | 92 | 0.3 | 16.5 | 0.36 | 20.1 | 120 | 91 | 50 | 1.70 |
| H1 | 14 | 1.06 | 0.65 | 91 | 0.3 | 20 | 0.36 | 20 | 120 | 90 | 40 | 1.40 |
| U1§ | 17.5 | 0.61 | 1.02 | 91 | 0.3 | 50 | 0.36 | 50 | 162 | 95 | 100 | 0.56 |
| V1 | 17.5 | 0.61 | 1.02 | 90 | 0.3 | 50 | 0.36 | 50 | 160 | 96 | 66.6 | 0.56 |
| W1 | 17.5 | 0.61 | 1.02 | 91 | 0.3 | 52 | 0.36 | 52 | 160 | 96 | 50 | 0.54 |
| X1 | 16.3 | 0.61 | 1.02 | 91 | 0.3 | 52 | 0.36 | 52 | 160 | 95 | 40 | 0.54 |
| Y1§ | 11 | 0.66 | 1.08 | 120 | 0.03 | 140 | 0.036 | 140 | 163 | 91 | 100 | 2.00 |
| Z1 | 11 | 0.66 | 1.02 | 120 | 0.03 | 140 | 0.036 | 140 | 163 | 91 | 66.6 | 2.00 |
| AA1 | 11 | 0.66 | 1.08 | 120 | 0.03 | 140 | 0.036 | 140 | 163 | 91 | 50 | 2.00 |
| AB1 | 11 | 0.66 | 1.08 | 120 | 0.03 | 140 | 0.03 | 140 | 163 | 91 | 40 | 2.00 |

§1$^{st}$ reactor products only

TABLE 1B

Second reactor process conditions to produce diblock copolymers B1-D1, F1-H1, V1-X1, Z1-AB1.

| Example | Solvent feed (kg/hr) | Propylene feed (kg/hr) | Temp °C. | Catalyst conc (mmol/Kg) | Catalyst sol. Flow (g/hr) | Cocatalyst conc. (mmol/kg) | Cocatalyst sol. Flow (g/hr) | MMAO flow (gr/hr) | C3 conversion (%) | Efficiency (gPoly/gM) $*10^{-6}$ |
|---|---|---|---|---|---|---|---|---|---|---|
| A1§ | | | | | | | | | | |
| B1 | 13 | 1.11 | 90 | 0.3 | 90 | 0.36 | 90 | 45 | 91 | 0.41 |
| C1 | 20 | 2.22 | 90 | 0.3 | 120 | 0.36 | 120 | 50 | 91 | 0.46 |
| D1 | 21 | 2.5 | 90 | 0.3 | 177 | 0.36 | 177 | 50 | 91 | 0.32 |
| E1§ | | | | | | | | | | |
| F1 | 10 | 0.83 | 91 | 0.3 | 24 | 0.36 | 24 | 100 | 91 | 1.11 |
| G1 | 16 | 1.66 | 90.2 | 0.3 | 92 | 0.36 | 92 | 80 | 91 | 0.52 |
| H1 | 21 | 2.5 | 90 | 0.3 | 175 | 0.36 | 175 | 80 | 91 | 0.37 |
| U1§ | | | | | | | | | | |
| V1 | 10 | 0.78 | 90.2 | 0.3 | 90 | 0.36 | 90 | 100 | 96 | 0.30 |
| W1 | 15 | 1.36 | 90.2 | 0.3 | 177 | 0.36 | 177 | 110 | 95 | 0.24 |
| X1 | 20.5 | 2.36 | 90.5 | 0.3 | 260 | 0.36 | 260 | 220 | 95 | 0.22 |
| Y1§ | | | | | | | | | | |
| Z1 | 10 | 0.83 | 120 | 0.03 | 160 | 0.036 | 160 | 100 | 90 | 1.40 |
| AA1 | 11 | 1.66 | 120.1 | 0.03 | 250 | 0.036 | 250 | 100 | 90 | 1.44 |
| AB1 | 16 | 2.5 | 120 | 0.3 | 60 | 0.3 | 60 | 100 | 90 | 0.95 |

§1st reactor products only

Preparation of Fractionated Samples

Two to four grams of polymer is dissolved in 200 ml o-xylene under reflux conditions for 2 hours. The solution is then cooled in a temperature controlled water bath to 25° C. to allow the crystallization of the xylene insoluble fraction. Once the solution is cooled and the insoluble fraction precipitates from the solution, the separation of the xylene soluble fraction from the xylene insoluble fraction is done by filtration through a filter paper. The remaining o-xylene solvent is evaporated from the filtrate. Both xylene soluble (XS) and xylene insoluble (XI) fractions are dried in a vacuum oven at 100° C. for 60 min and then weighed.

For each set of samples, the xylene insoluble fraction is given the number "2" and the xylene soluble fraction the number "3". For example, sample B1 is subjected to the extraction procedure to produce sample B2 (the xylene insoluble fraction) and sample B3 (the xylene soluble fraction).

Table 2 shows the analytical results for runs B1 through AB1. The molecular weight distributions of the polymers are relatively narrow with Mw/Mn's ranging from 2.1-2.3 for samples B1 through D1, and 2.2-2.8 for samples F1 through H1. For samples V1 through AB1, Mw/Mn's range from 2.1-2.5. For the corresponding xylene insoluble and soluble fractions for each of the runs (designated by the number 2 or 3), the Mw/Mn's range from 2.0 to 2.8.

Table 2 also shows the wt % of isolated PP identified by High Temperature Liquid Chromatography separation. The amount of isolated PP indicates to the amount of PP that is not incorporated into the block copolymer. The weight fraction of isolated PP and the weight fraction of xylene solubles subtracted from 1 can be related to the yield of diblock polymer produced.

The molecular weight distributions of the polymers are relatively narrow with Mw/Mn's ranging from 2.1-2.3 for samples B1 through D1, and 2.2-2.8 for samples F1 through H1. For samples V1 through AB1, Mw/Mn's range from 2.1-2.5. For the corresponding xylene insoluble and soluble fractions for each of the runs (designated by the number 2 or 3), the Mw/Mn's range from 2.0 to 2.8.

TABLE 2

Analytical Summary Examples B1-AB1 and Fractions

| Example | Wt % from Extraction | Mw Kg/mol | Mw/Mn | Wt % $C_2$ | Tm (° C.) | Tc (° C.) | Melt Enthalpy (J/g) | Tg (° C.) | Wt % PP from HTLC Separation |
|---|---|---|---|---|---|---|---|---|---|
| B1 | NA | 123 | 2.2 | 45 | 130 | 85 | 43 | −46 | 11.8 |
| B2 | 37.8 | 165 | 2.0 | 20.3 | 131 | 93 | 80 | ND | 26 |
| B3 | 62.2 | 124 | 2.1 | 64.4 | 23 | 26.11 | 27 | −49 | <0.1 |
| C1 | NA | 128 | 2.1 | 34 | 134 | 92 | 56 | −57 | — |
| C2 | 50.4 | 243 | 2.8 | 12.4 | 137 | 99 | 83 | ND | — |
| C3 | 49.6 | 136 | 2.1 | 61.1 | 9 | 5 | 26 | −51 | — |
| D1 | NA | 180 | 2.3 | 26 | 138 | 93 | 56 | −49 | 28.1 |
| D2 | 63.3 | 284 | 2.1 | 10.1 | 138 | 100 | 86 | ND | 44.1 |
| D3 | 37.7 | 130 | 2.1 | 61.5 | 11 | 6 | 28 | −51 | <0.1 |
| F1 | NA | 149 | 2.2 | 27 | 135 | 91 | 28 | −50 | 22 |
| F2 | 33.9 | 207 | 2.3 | 8.3 | 137 | 99 | 80 | ND | 49 |
| F3 | 66.1 | 143 | 2.1 | 38.5 | ND | ND | 1.4 | −51 | 0.8 |
| G1 | NA | 210 | 2.5 | 18.2 | 139 | 99 | 49 | −52 | — |
| G2 | 51.9 | 302 | 2.3 | 5.8 | 140 | 102 | 76 | −51 | — |
| G3 | 48.1 | 139 | 2.1 | 39.8 | ND | ND | ND | ND | — |
| H1 | NA | 251 | 2.8 | 14.8 | 141 | 103 | 61 | −53.5 | — |
| H2 | 60.6 | 371 | 2.5 | 4.4 | 142 | 105 | 83.5 | ND | — |
| H3 | 39.4 | 141 | 2.2 | 38.1 | ND | ND | 1.4 | −51 | — |
| V1 | NA | 120 | 2.1 | 45 | 131.1 | 88.3 | 59.3 | −44 | — |
| V2 | 41.7 | — | — | 20.4 | — | — | — | — | — |

TABLE 2-continued

Analytical Summary Examples B1-AB1 and Fractions

| Example | Wt % from Extraction | Mw Kg/mol | Mw/Mn | Wt % C$_2$ | Tm (° C.) | Tc (° C.) | Melt Enthalpy (J/g) | Tg (° C.) | Wt % PP from HTLC Separation |
|---|---|---|---|---|---|---|---|---|---|
| V3 | 58.3 | — | — | 67 | — | — | — | — | — |
| W1 | NA | 148 | 2.1 | 34 | 135.2 | 96.7 | 68.2 | −44.2 | — |
| W2 | 57 | — | — | 15.9 | — | — | — | — | — |
| W3 | 43.0 | — | — | 67.8 | — | — | — | — | — |
| X1 | NA | 198 | 2.5 | 26 | 138.4 | 101.4 | 73.7 | −48.2 | — |
| X2 | 65.5 | — | — | 11.3 | — | — | — | — | — |
| X3 | 34.5 | — | — | 64.1 | — | — | — | — | — |
| Z1 | NA | 114 | 2.2 | 27 | 120.4 | 71.4 | 54.4 | −43.9 | — |
| Z2 | 31.7 | — | — | 18.9 | — | — | — | — | — |
| Z3 | 68.3 | — | — | 65.9 | — | — | — | — | — |
| AA1 | NA | 136 | 2.2 | 20 | 129.6 | 88.8 | 64.1 | −45.3 | — |
| AA2 | 50.7 | — | — | 14.9 | — | — | — | — | — |
| AA3 | 49.3 | — | — | 69 | — | — | — | — | — |
| AB1 | NA | 168 | 2.4 | 15 | 134.7 | 97.6 | 67.9 | −47.5 | — |
| AB2 | 64.4 | — | — | 11.8 | — | — | — | — | — |
| AB3 | 35.6 | — | — | 67.7 | — | — | — | — | — |

FIG. 1 shows the DSC melting curve for the B1 sample. The peak at 130° C. corresponds to the iPP "hard" polymer and the broader peak at 30° C. corresponds to the EP "soft" polymer; the glass transition temperature at −46° C. also corresponds to the EP "soft" polymer containing 64 wt % ethylene (C$_2$).

Figure 2:
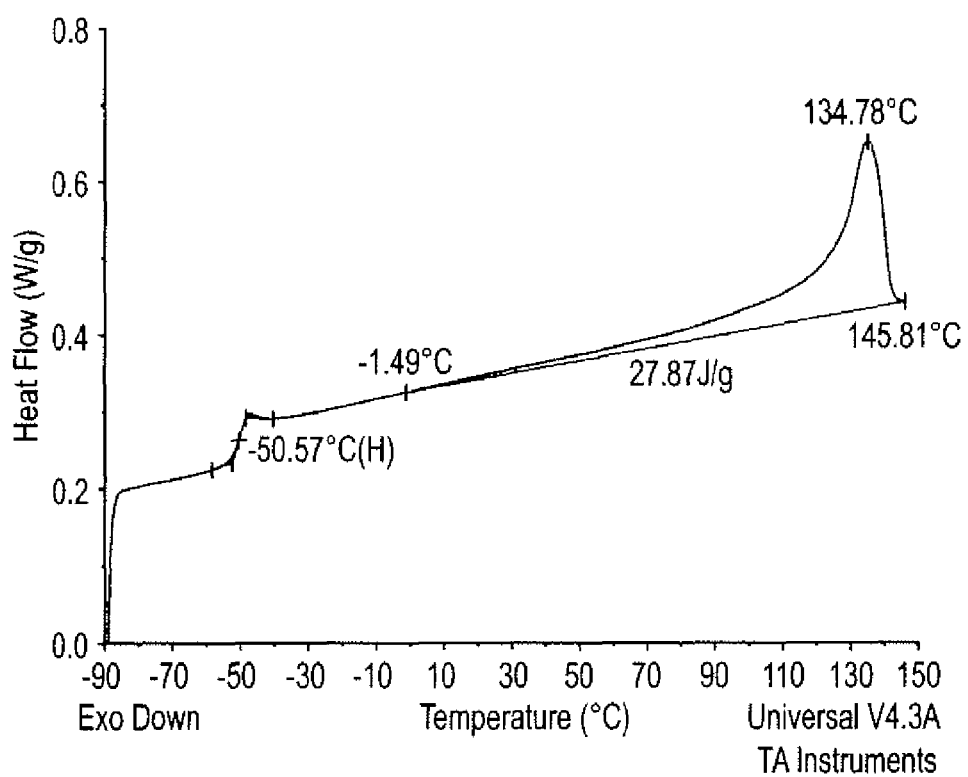
FIG. 2 shows the DSC melting curve for Example F1.

FIG. 2 shows the DSC melting curve for the F1 sample. The peak at 135° C. corresponds to the iPP "hard" polymer and the absence of crystallinity below room temperature corresponds to the EP "soft" polymer containing 40 wt % C$_2$. The −50° C. Tg confirms the presence of the EP "soft" polymer containing 40 wt % C$_2$.

Figure 3:
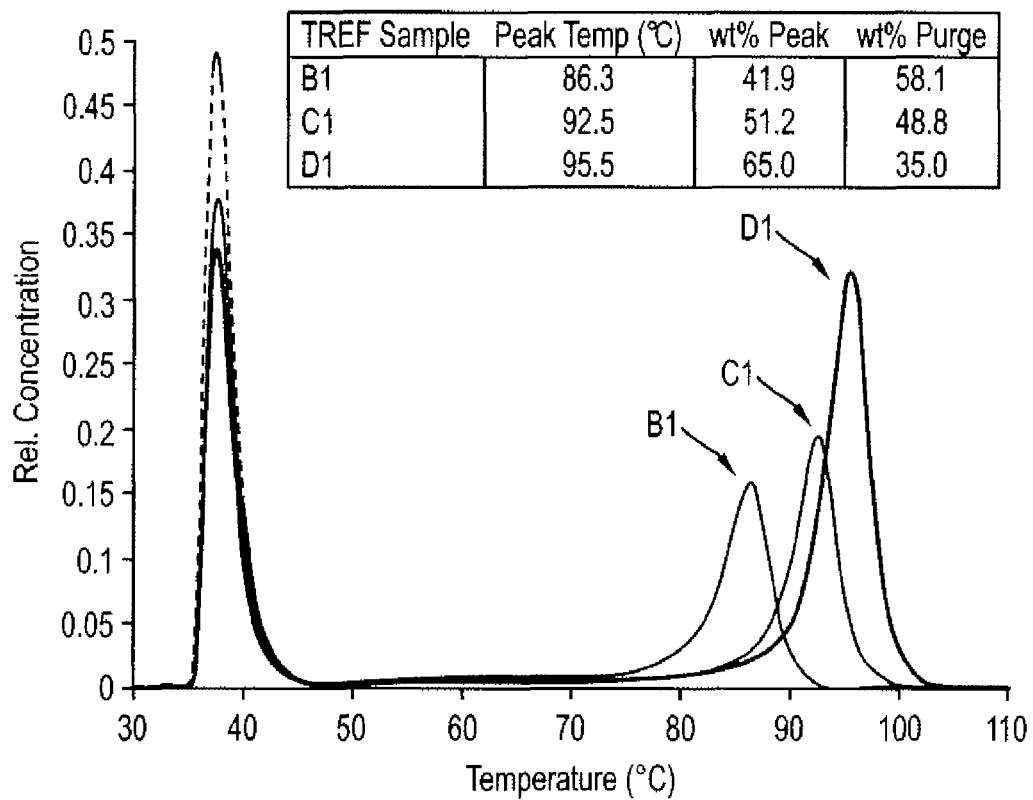
FIG. 3 compares the TREF profiles of Examples B1, C1 and D1.

The presence of block copolymer can alter the crystallization characteristics of a polymer chain if measured by TREF or solution fractionation. FIG. 3 compares the TREF profiles of samples B1 through D1. The TREF profiles are consistent with the DSC results, showing a highly crystalline fraction (elution above 40° C.) and a low crystallinity, soluble fraction (remaining material that elutes at less than 40° C.). The elution temperature increases with the amount of iPP present. An EP block connected to an iPP block may enhance the chains' solubility in the solvent and/or interfere with the crystallization of the iPP block.

Figure 4:
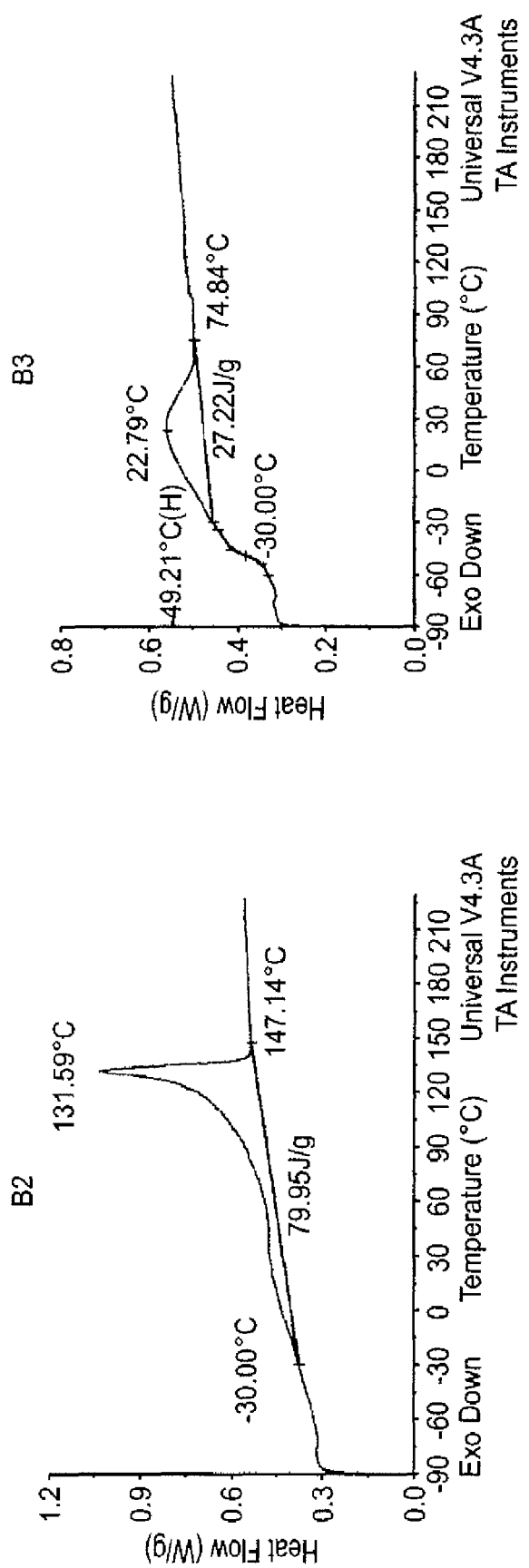
FIG. 4 shows DSC curves of Examples B2 and B3.
Figure 5:
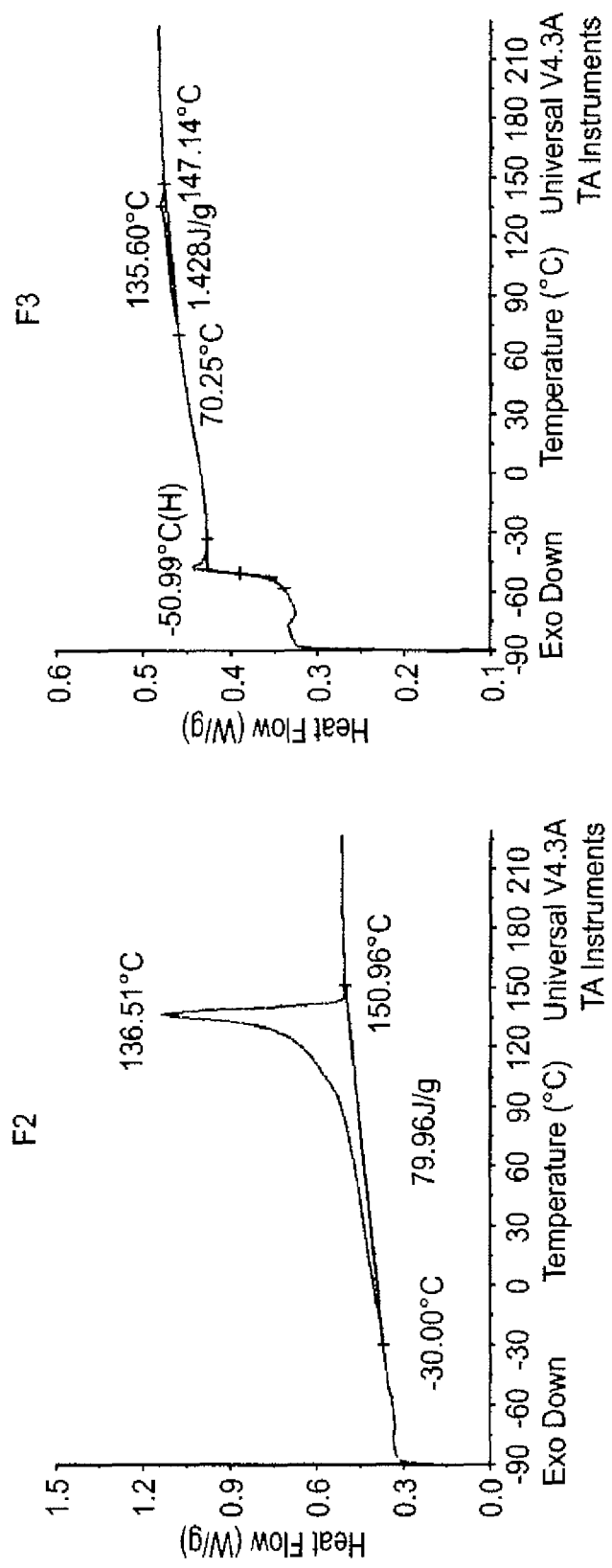
FIG. 5 shows DSC curves of Examples F2 and F3.

FIGS. 4 and 5 show the corresponding DSC curves of the fractions of B2, B3 and F2, F3.

In this analysis, the xylene soluble fraction is an estimate of the amount of non-crystallizable soft polymer. For the xylene soluble fractions from samples B1-D1, the weight percent of ethylene is between 61 and 65 wt % ethylene with no detection of residual isotactic propylene. The DSC of the xylene soluble fraction confirms that no high crystallinity polypropylene is present.

Conversely, the insoluble fraction (designated as number 2) can contain an amount of iPP polymer and iPP-EP diblock. Since the crystallization and elution of the polymer chain is governed by its longest crystallizable propylene sequence, the diblock copolymer will precipitate along with the iPP polymer. This is verified by the NMR and DSC analysis that shows an appreciable, and otherwise unexplainable, amount of ethylene present in the "insoluble" fraction. In a typical separation of an iPP and EP rubber blend, the isotactic PP will be cleanly separated by this analysis. The fact that there is "additional" ethylene present in the insoluble fraction, verifies that a fraction of diblock is present. By accounting for the total mass balance of monomer between the fractions, a block composite index can be estimated.

Another indication of the presence of diblock is the increase in molecular weight of the insoluble fractions with the increasing amount of iPP. As the polymer chains are being coordinatively coupled while passing from the first reactor to the second reactor, it is expected that the molecular weight of the polymer will increase. Table 3 shows that the molecular weight of the soluble fractions remains relatively constant (120-140 kg/mol). This is expected because the reactor conditions to make the EP soft block were unchanged from run to run. However, the molecular weight of the insoluble fractions increases with the increase in production rate of reactor 2, to create longer iPP blocks.

Estimating the Block Composite Index

The inventive examples show that the insoluble fractions contain an appreciable amount of ethylene that would not otherwise be present if the polymer was simply a blend of iPP homopolymer and EP copolymer. To account for this "extra ethylene", a mass balance calculation can be performed to estimate a block composite index from the amount of xylene insoluble and soluble fractions and the weight % ethylene present in each of the fractions.

A summation of the weight % ethylene from each fraction according to equation 1 results in an overall weight % ethylene (in the polymer). This mass balance equation can also be used to quantify the amount of each component in a binary blend or extended to a ternary, or n-component blend.

$$\text{Wt \% } C_{2_{Overall}} = w_{Insoluble}(\text{wt \% } C_{2_{Insoluble}}) + w_{soluble}(\text{wt \% } C_{2_{soluble}}) \qquad \text{Eq. 1}$$

Applying equations 2 through 4, the amount of the soft block (providing the source of the extra ethylene) present in the insoluble fraction is calculated. By substituting the weight % C$_2$ of the insoluble fraction in the left hand side of equation 2, the weight % iPP hard and weight % EP soft can be calculated using equations 3 and 4. Note that the weight % of ethylene in the EP soft is set to be equal to the weight % ethylene in the xylene soluble fraction. The weight % ethylene in the iPP block is set to zero or if otherwise known from its DSC melting point or other composition measurement, the value can be put into its place.

$$\text{Wt \% C2}_{Overall\ or\ xylene\ insoluble} = \qquad\qquad\text{Eq. 2}$$
$$w_{iPPHard}(\text{wt \% C2}_{iPP}) + w_{EPsoft}(\text{wt \% C2}_{EPsoft})$$

$$w_{iPPhard} = \frac{\text{wt \% C2}_{overall\ or\ xyleneinsoluble} - \text{wt \% C2}_{EPsoft}}{\text{wt \% C2}_{iPPhard} - \text{wt \% C2}_{EPsoft}} \qquad\text{Eq. 3}$$

$$w_{EPsoft} = 1 - w_{iPPHard} \qquad\qquad\text{Eq. 4}$$

After accounting for the 'additional' ethylene present in the insoluble fraction, the only way to have an EP copolymer present in the insoluble fraction, the EP polymer chain must be connected to an iPP polymer block (or else it would have been extracted into the xylene soluble fraction). Thus, when the iPP block crystallizes, it prevents the EP block from solubilizing.

To estimate the block composite index, the relative amount of each block must be taken into account. To approximate this, the ratio between the EP soft and iPP hard is used. The ratio of the EP soft polymer and iPP hard polymer can be calculated using Equation 2 from the mass balance of the total ethylene measured in the polymer. Alternatively it could also be estimated from a mass balance of the monomer and comonomer consumption during the polymerization. Refer to Table 3 for the estimated ratio of iPP and EP present in the diblock copolymer for all the runs. The weight fraction of iPP hard and weight fraction of EP soft is calculated using Equation 2 and assumes the iPP hard contains no ethylene. The weight % ethylene of the EP soft is the amount of ethylene present in the xylene soluble fraction.

TABLE 3

Block Composite Index Estimations for Examples B1 through AB3

| Sample | wt fraction EP Soft | wt fraction iPP Hard | Block Composite Index |
|---|---|---|---|
| B1 | 0.30 | 0.70 | 0.16 |
| B2 | 0.32 | 0.68 | 0.42 |
| B3 | 0 | 100 | 0 |
| C1 | 0.56 | 0.44 | 0.17 |
| C2 | 0.20 | 0.80 | 0.34 |
| C3 | 0 | 100 | 0 |
| D1 | 0.42 | 0.58 | 0.22 |
| D2 | 0.16 | 0.84 | 0.35 |
| D3 | 0 | 100 | 0 |
| F1 | 0.70 | 0.30 | 0.10 |
| F2 | 0.22 | 0.78 | 0.29 |
| F3 | 0 | 100 | 0 |
| G1 | 0.46 | 0.54 | 0.15 |
| G2 | 0.15 | 0.85 | 0.29 |
| G3 | 0 | 100 | 0 |
| H1 | 0.39 | 0.61 | 0.18 |
| H2 | 0.12 | 0.88 | 0.29 |
| H3 | 0 | 100 | 0 |
| V1 | 0.67 | 0.33 | 0.18 |
| V2 | 0.30 | 0.70 | 0.43 |
| V3 | 0 | 100 | 0 |
| W1 | 0.50 | 0.50 | 0.24 |
| W2 | 0.23 | 0.77 | 0.42 |
| W3 | 0 | 100 | 0 |
| X1 | 0.41 | 0.59 | 0.25 |
| X2 | 0.18 | 0.82 | 0.39 |
| X3 | 0 | 100 | 0 |
| Z1 | 0.41 | 0.59 | 0.12 |
| Z2 | 0.29 | 0.71 | 0.38 |
| Z3 | 0 | 100 | 0 |
| AA1 | 0.29 | 0.71 | 0.18 |
| AA2 | 0.22 | 0.78 | 0.35 |
| AA3 | 0 | 100 | 0 |
| AB1 | 0.22 | 0.78 | 0.24 |
| AB2 | 0.17 | 0.83 | 0.38 |
| AB3 | 0 | 100 | 0 |

For example, if an inventive iPP-EP polymer contains an overall of 47 wt % C$_2$ and is made under the conditions to produce an EP soft polymer with 67 wt % C$_2$ and an iPP homopolymer containing zero ethylene, the amount of EP soft and iPP hard is 70 wt % and 30 wt %, respectively (as calculated using Equations 3 and 4). If the percent of EP is 70 wt % and the iPP is 30 wt %, the relative ratio of the EP:iPP blocks could be expressed as 2.33:1.

Hence, if one skilled in the art, carries out a xylene extraction of the polymer and recovers 40 wt % insoluble and 60 wt % soluble, this would be an unexpected result and this would lead to the conclusion that a fraction of inventive block copolymer was present. If the ethylene content of the insoluble fraction is subsequently measured to be 25 wt % C$_2$, Equations 2 thru 4 can be solved to account for this additional ethylene and result in 37.3 wt % EP soft polymer and 62.7 wt % iPP hard polymer present in the insoluble fraction.

Since the insoluble fraction contains 37.3 wt % EP copolymer, it should be attached to an additional 16 wt % of iPP polymer based on the EP:iPP block ratio of 2.33:1. This brings the estimated amount of diblock in the insoluble fraction to be 53.3 wt %. For the entire polymer (unfractionated), the composition is described as 21.3 wt % iPP-EP Diblock, 18.7 wt % iPP polymer, and 60 wt % EP polymer. As the compositions of these polymers are novel, the term block composite index (BCI) is herein defined to equal the weight percentage of diblock divided by 100% (i.e. weight fraction). The value of the block composite index can range from 0 to 1, wherein 1 would be equal to 100% inventive diblock and zero would be for a material such as a traditional blend or random copolymer. For the example described above, the block composite index for the block composite is 0.213. For the insoluble fraction, the BCI is 0.533, and for the soluble fraction the BCI is assigned a value of zero.

Depending on the estimations made of the total polymer composition and the error in the analytical measurements which are used to estimate the composition of the hard and soft blocks, between 5 to 10% relative error is possible in the computed value of the block composite index. Such estimations include the wt % C2 in the iPP hard block as measured from the DSC melting point, NMR analysis, or process conditions; the average wt % C2 in the soft block as estimated from the composition of the xylene solubles, or by NMR, or by DSC melting point of the soft block (if detected). But overall, the block composite index calculation reasonably accounts for the unexpected amount of 'additional' ethylene present in the insoluble fraction, the only way to have an EP copolymer present in the insoluble fraction, the EP polymer chain must be connected to an iPP polymer block (or else it would have been extracted into the xylene soluble fraction).

More specifically, example H1, contains an overall of 14.8 wt % $C_2$ and the weight % C2 in the xylene solubles (H3) was measured to be 38.1 wt % (as a representation of the composition of the EP soft polymer) and an iPP homopolymer containing zero ethylene, the amount of EP soft and iPP hard is 61 wt % and 39 wt %, respectively (as calculated using Equations 3 and 4). If the percent of EP is 61 wt % and the iPP is 39 wt %, the relative ratio of the EP:iPP blocks could be expressed as 1.56:1.

After xylene extraction of the H1 polymer, 60.6 wt % insoluble (H2) and 39.4 wt % soluble (B3) polymer was recovered. The B2 insoluble fraction is subsequently measured to have 4.4 wt % $C_2$, Equations 2 thru 4 can be solved to account for this additional ethylene and result in 11.5 wt % EP soft polymer and 88.5 wt % iPP hard polymer.

Since the insoluble fraction contains 11.5 wt % EP copolymer, it should be attached to an additional 7.35 wt % of iPP polymer based on the EP:iPP block ratio of 1.56:1. This brings the estimated amount of diblock in the insoluble fraction to be 29.6 wt %. For the entire polymer (unfractionated), the composition is described as 18 wt % iPP-EP Diblock, 42.6 wt % iPP polymer, and 39.4 wt % EP polymer. For this H1 example described above, the block composite index for the block composite is 0.18. For the insoluble fraction (H2), the BCI is 0.29, and for the H3 soluble fraction the BCI is assigned a value of zero.

Figure 6:
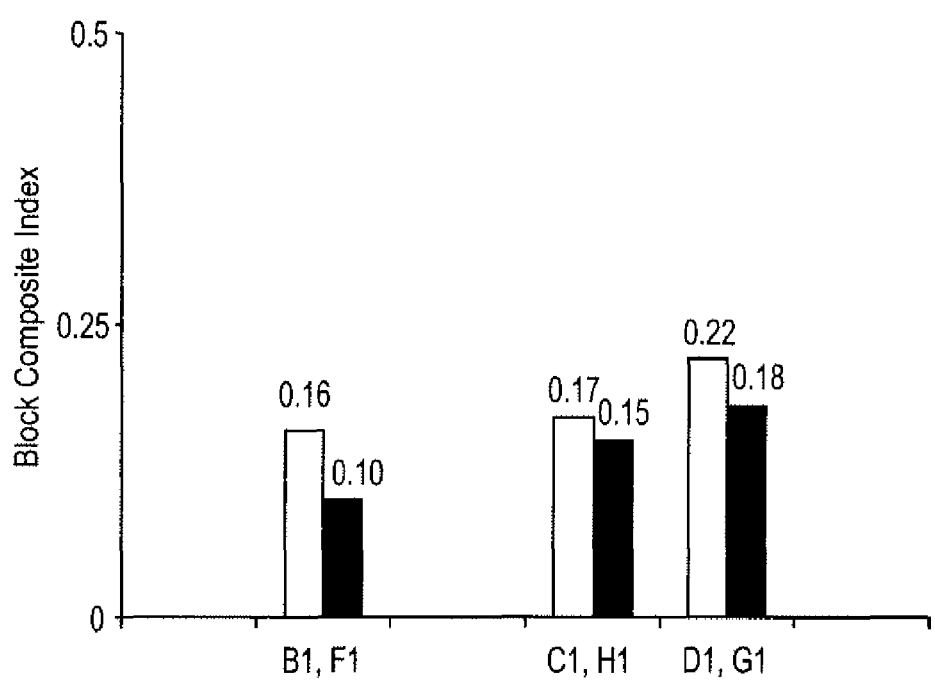
FIG. 6 shows Block Composite Index for Examples B1, F1, C1, H1, D1 and G1.

Table 3 and FIG. 6 show the block composite indices for runs B1 through ABE For runs B1, C1, and D1, the BCI values are 0.16, 0.17, and 0.22, respectively. For the associated xylene insoluble fractions, fractions B2, C2, D2, the BCI values are 0.42, 0.34, and, 0.35, respectively. For runs F1, G1, and H1, the BCI values are 0.10, 0.15, and 0.18, respectively. For the associated xylene insoluble fractions, fractions F2, G2, H2, the BCI values are 0.29, 0.29, and, 0.29, respectively.

Figure 7:
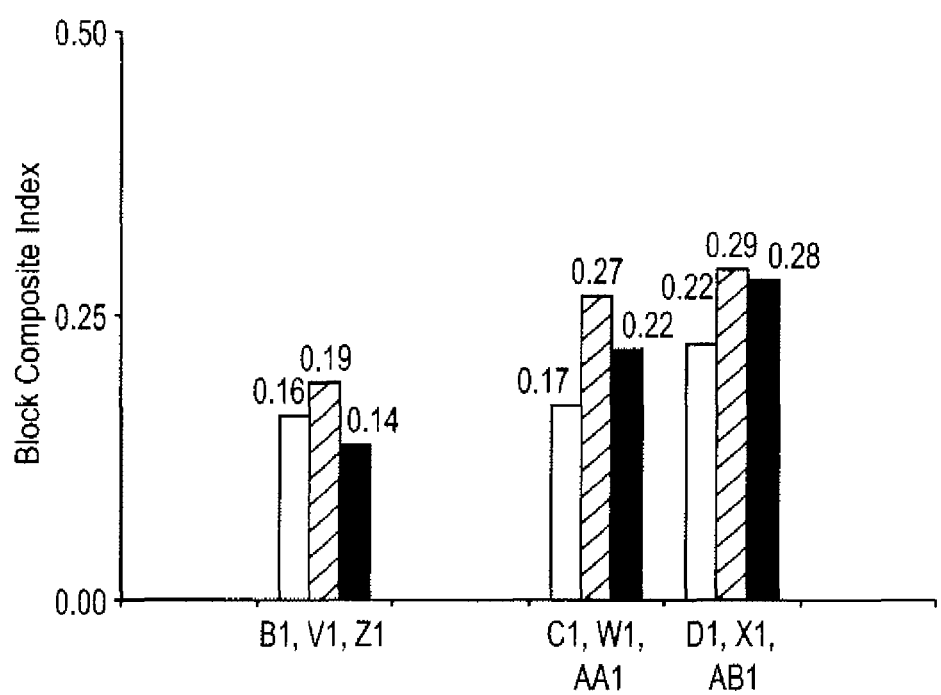
FIG. 7 shows Block Composite Index for Examples B1, V1, Z1, C1, W1, AA1, D1, X1, and AB1.

Table 3 and FIG. 7 show for runs V1, W1, X1, increasing the propylene reactor conversion from 90 to 95% increases the BCI by 0.03 to 0.09 to result in BCI values of 0.18, 0.24, and 0.25.

Table 3 and FIG. 7 show for runs Z1, AA1, AB1 increasing the reactor temperature from 90 to 120° C. resulted in BCI values of 0.12, 0.18, and 0.24, respectively.

Dynamic Mechanical Analysis

Figure 8:
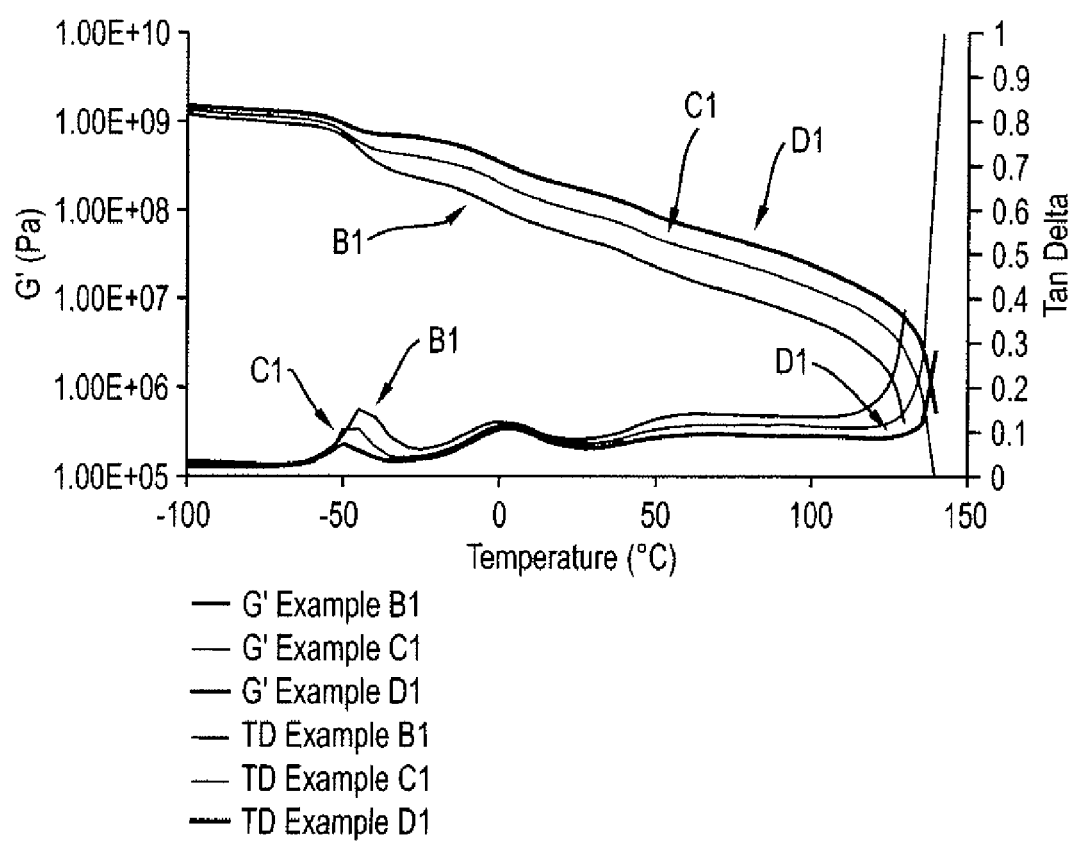
FIG. 8 shows Dynamic Mechanical Analysis of Examples B1, C1 and D1.

FIG. 8 shows the dynamic mechanical properties of samples B1 through D1; shown is the G' and Tan delta values versus temperature. By increasing the amount of iPP, the G' modulus increases and the high temperature plateau is extended. Sample D1 shows that the modulus decreases with increasing temperature up to about 140° C. before completely softening after its melting transition.

For each sample, the tan delta curve shows a characteristic Tg between −48 to −50° C. for the ethylene-propylene copolymer and a second Tg at about 0° C. from the isotactic polypropylene. Above 50° C., the tan delta response remains constant until melting begins and the modulus decreases rapidly.

Figure 9:
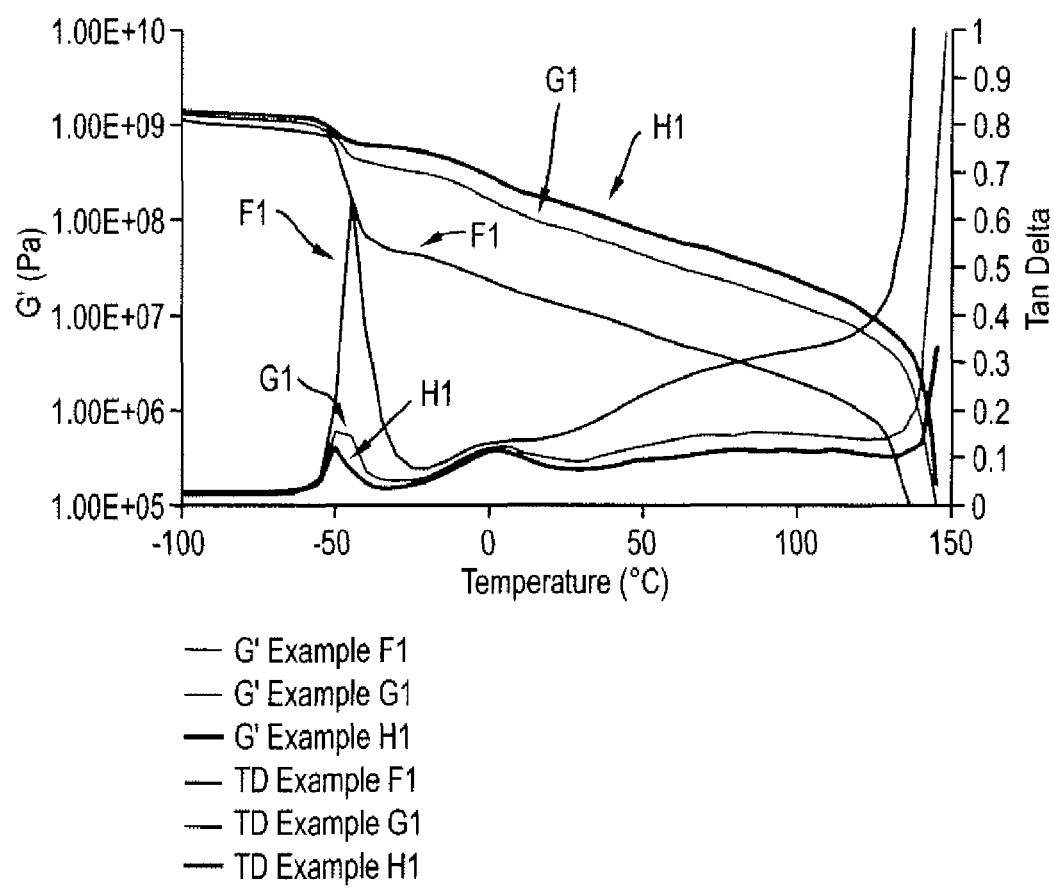
FIG. 9 shows Dynamic Mechanical Analysis of Examples F1, G1 and H1.

FIG. 9 shows the dynamic mechanical properties of samples F1 through H1; shown are the G' and Tan delta values versus temperature. Similar to the 65 wt % $C_2$ case, by increasing the amount of iPP, the G' modulus increases and the high temperature plateau is extended. Sample H1 shows that the modulus decreases with increasing temperature up to about 140° C. before completely softening after its melting transition.

The tan delta curves for these samples, also show a characteristic Tg between −48 to −50° C. for the ethylene-propylene copolymer and a second Tg about 0° C. relating to the isotactic polypropylene. Above 50° C., the tan delta response remains constant for samples G1 & H1 until melting begins and the modulus decreases rapidly.

Morphology Discussion

Figure 10:
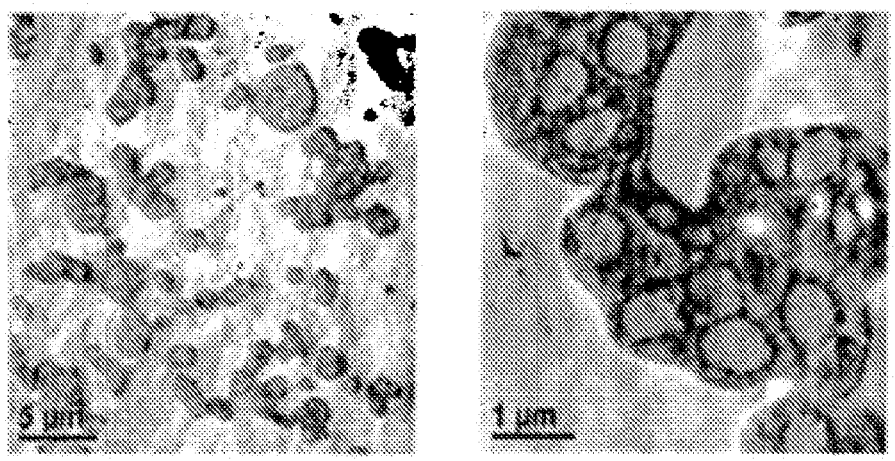
FIG. 10 shows a TEM Micrograph of Profax Ultra SG853 Polypropylene Impact Copolymer at 5 µm and 1 µm scales.

The samples are analyzed by TEM to observe the influence of the diblock on the overall iPP/EPR rubber morphology. FIG. 10 shows the TEM image of ProFax Ultra SG853 impact copolymer (LyondellBasell Polyolefins) consisting of an isotactic PP continuous phase and 17 wt % rubber phase, containing 58 wt % $C_2$ in the rubber.

The TEM micrograph shown at the 5 μm scale, shows large EPR domains ranging from 2-5 μm.

At 1 μm magnification, the EPR domain has a heterogeneous composition distribution of ethylene and propylene as shown from the dark and light colored domains present within the particle. This is a classical example of a dispersed morphology containing two phases (iPP and EP rubber) that are immiscible with each other.

Figure 11:
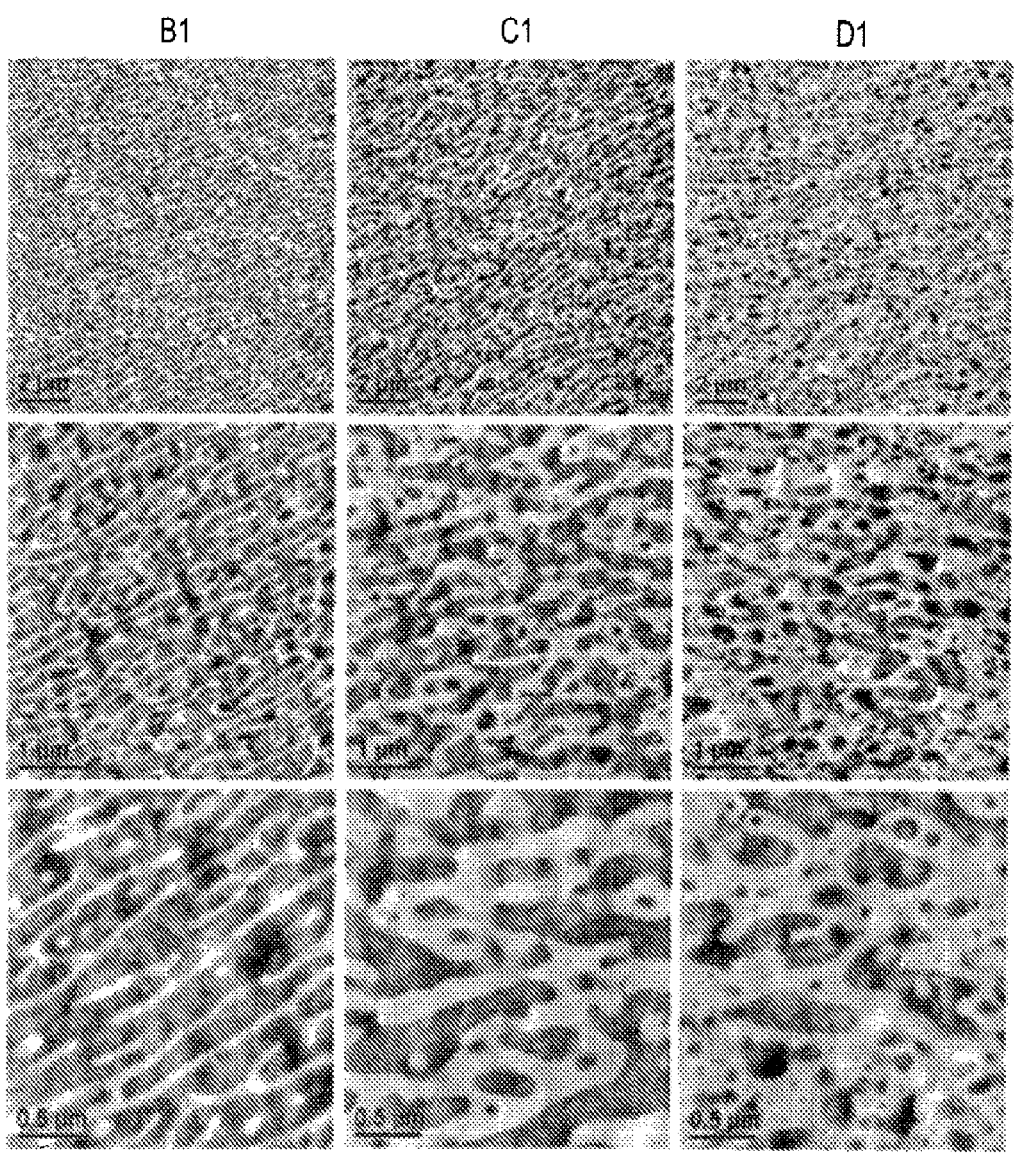
FIG. 11 shows TEM Micrographs of Examples B1, C1 and D1 at 2 µm, 1 µm and 0.5 µm scales.

FIG. 11 shows the TEM micrographs of compression molded films of B1, C1, and D1 at the 2, 1, and 0.5 μm scale. In stark contrast to the image from the impact copolymer, all three polymers show a finer dispersion of particles with very small domains. For B1, a continuous EPR phase is observed along with elongated PP domains on the order of 80-100 nm in width. For C1, a mixed continuity between the iPP and EPR phases was observed with domain sizes on the 200-250 nm. For D1, a PP continuous phase is observed along with spherical and some elongated EPR domains on the size 150-300 nm.

Figure 12:
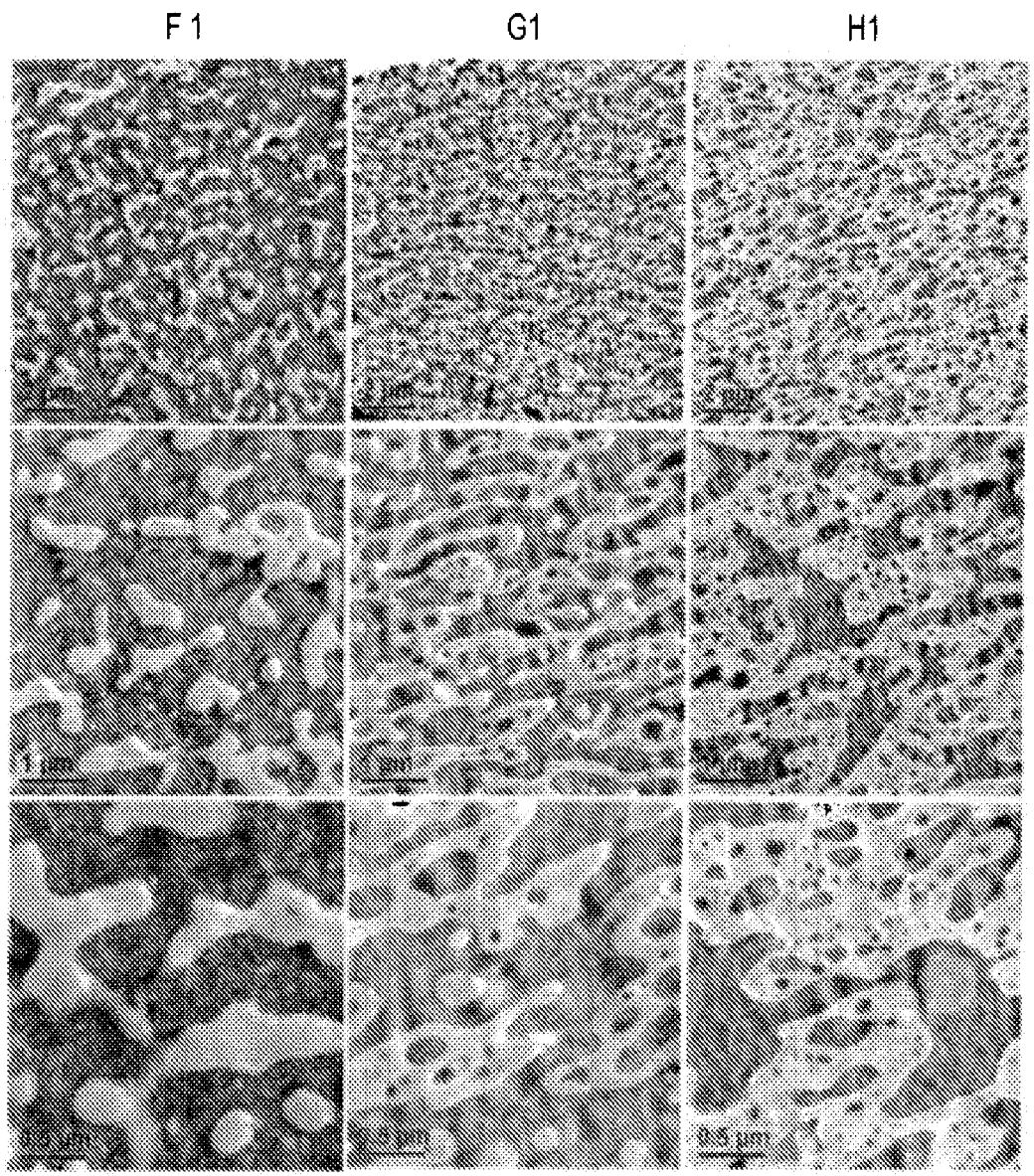
FIG. 12 shows TEM Micrographs of Examples F1, G1 and H1 at 2 µm, 1 µm and 0.5 µm scales.

FIG. 12 shows the TEM micrographs of compression molded films of F1, G1, and H1 at the 2, 1, and 0.5 μm scale. In stark contrast to the image from the impact copolymer, all three polymers show a finer dispersion of particles with very small domains. For F1, a continuous EPR phase is observed along with elongated PP domains on the order of 200-400 nm in width. For C1, a mixed continuity between the iPP and EPR phases was observed with domain sizes on the 200-300 nm. For H1, a PP continuous phase is observed along with spherical and some elongated EPR domains on the size 150-300 nm.

It is surprising to observe such well-dispersed and small domains as shown in these micrographs from polymers that were compression molded from pellets. Normally to get a fine morphology (not near the scales shown here), specialized extrusion and compounding histories are required. Even if the size scales are approached using blending, the morphologies may not be stable; phase coarsening and agglomeration can occur with the thermal aging, as shown by the impact copolymer in which the rubber domains are elongated and some of them chain-linked together.

The morphology of the diblock copolymer was further investigated by examining the polymer fractions obtained from xylene fractionation. As explained above, the insoluble fraction contains iPP-EP diblock and free iPP homopolymer while the soluble fraction contains, the non-crystallizable EP rubber.

Figure 13:
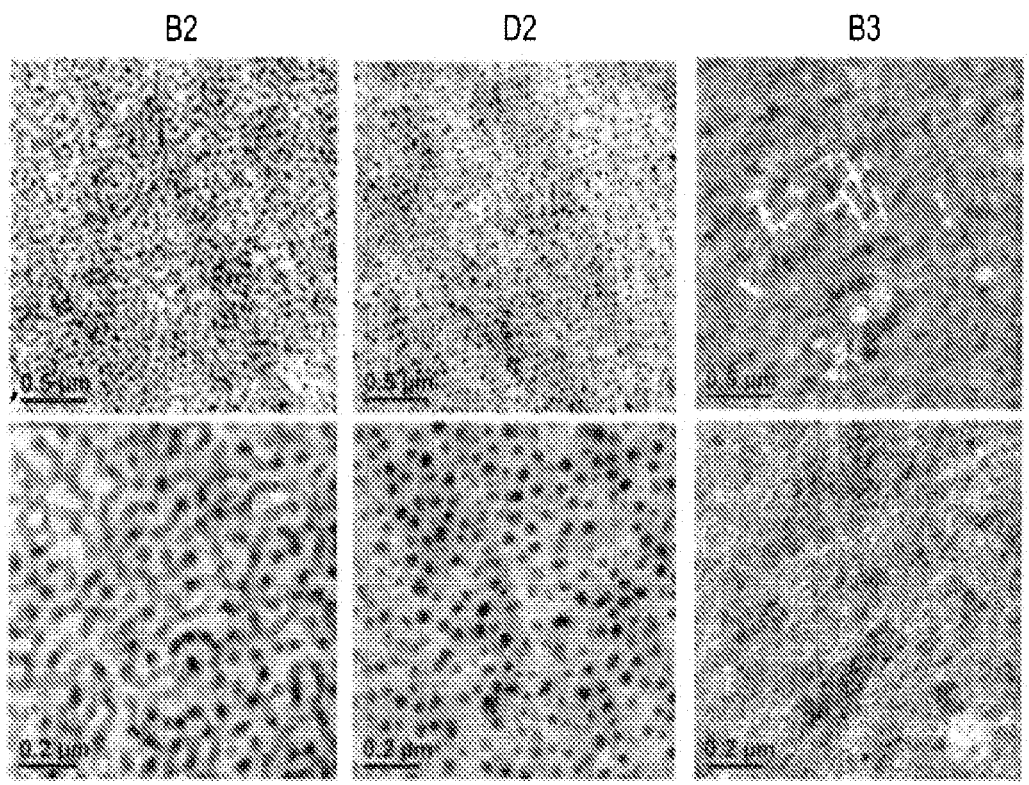
FIG. 13 shows TEM micrographs of Examples B2, D2 and B3 at 0.5 µm and 0.2 µm scales.

FIG. 13 shows the TEM micrographs of the insoluble fractions from B1 and D1 and also the soluble fraction from B1. Remarkably, the morphology observed in the insoluble fraction is even finer and more distinct than that of the whole polymer. The B1 insoluble fraction shows a mixture of worm-like and spherical EPR domains, on the size-scale of 50 nm in width. The D1 insoluble fraction shows small spherical domains that are also about 50 nm in diameter. For reference, the B1 xylene soluble fraction shows the typical granular lamellar structure that is expected of an EP elastomer containing 65 wt % $C_2$. Again, the morphologies of the insoluble fractions are distinct and appear to be microphase separated.

Figure 14:
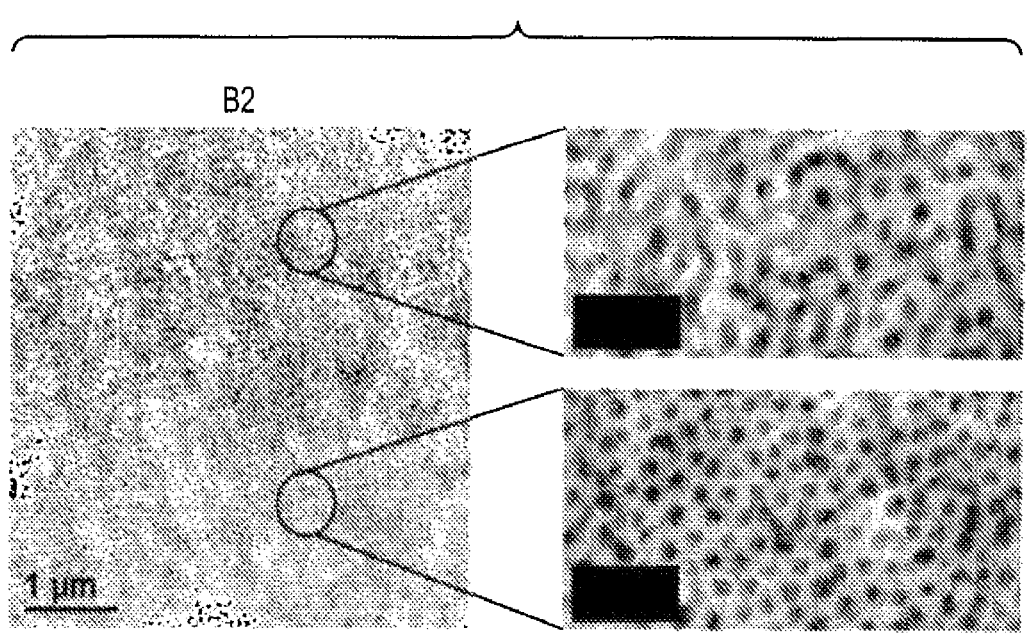
FIG. 14 shows Example B2 at 1 µm and 200 nm scales.
Figure 15:
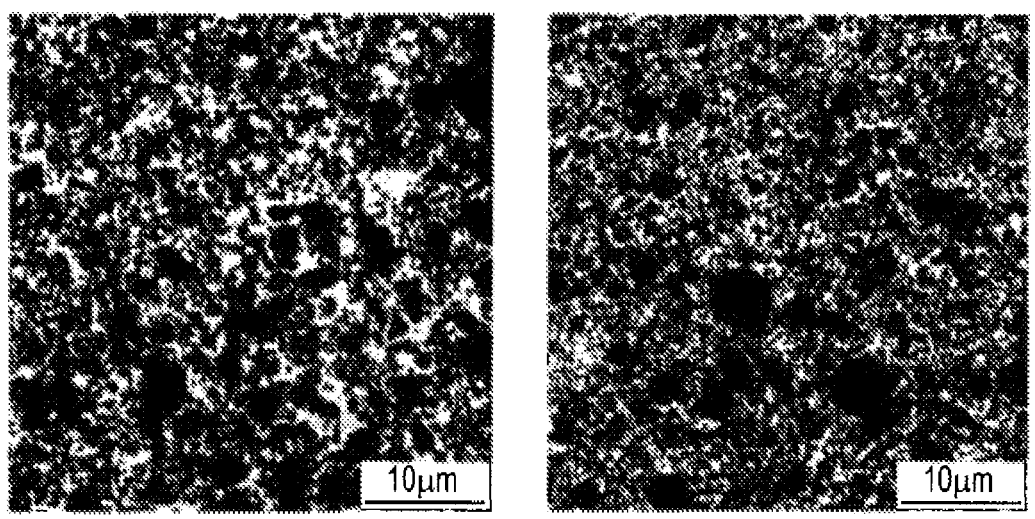
FIG. 15 shows AFM images of Comparative Example T1 on the left and Example T4 on the right.

It is interesting to compare the TEM micrographs of the B1 insoluble fraction, FIG. 15, to that of an sPP-EP-sPP triblock containing 71 wt % sPP, such as that shown in FIG. 7 of Macromolecules, Vol. 38, No. 3, page 857, 2005. In this figure, the sPP-EP-sPP triblock was produced via anionic polymerization and the micrograph is from a film annealed at 160° C. for over one week. The sample was annealed in the melt for a total of 8 days—the first 4 days at 200° C. to erase any previous thermal history and then an additional 4 days at a final temperature 160° C. High-vacuum ovens ($<10^{-7}$ mbar) were used to prevent degradation by oxidation. Melt morphology was preserved by quickly quenching the samples after annealing. The authors of the article associate the phase separated microstructure to hexagonally packed cylinders. Although the B1 insoluble fraction is prepared from a compression molded film that is fast quenched, the morphology resembles that of an ordered structure perhaps with some hexagonally packed cylinders (FIG. 14).

TPV Formulations and Mechanical Properties
Raw Materials:

Raw materials are shown in Table 4. The NORDEL MG resin contains 28 parts of carbon black per 100 parts EPDM elastomer. The carbon black is adhered to the resin in the form of core-shell morphology. Table 5 shows the composition and physical characterisitics of all polymer ingredients.

TABLE 4

| Materials | | |
|---|---|---|
| Chemical Name | CAS Number | Supplier |
| DOW 5D49(38 MFR, polypropylene homopolymer) | 9003-07-0 | The Dow Chemical Company |
| PROFAX 6823 (0.45MFR, polypropylene homopolymer) | 9003-07-0 | Lyondell Basell Polyolefins |
| DOW H700-12 (12MFR, polypropylene homopolymer) | 9003-07-0 | The Dow Chemical Company |
| NORDEL MG 47130.01 | 25038-36-2 | The Dow Chemical Company |
| NORDEL IP 4570 | 25038-36-2 | The Dow Chemical Company |
| Block composite | / | The Dow Chemical Company |
| Sunpar ™ 150 | 64741-88-4 | Sunoco Inc. |
| Hydrobrite 550 (a 550 cP clear aliphatic oil with a refractive index of 1.4752) | 8042-47-5 | Sonneborn. Inc |
| SP 1045 phenolic resin | 26678-93-3 | SI Group |
| Stannous chloride curing catalyst | 10025-69-1 | Mason Corporation |
| Sunproof ™ Improved (wax) | 8002-74-2 | Chemtura |
| Kadox ™ 720 (zinc oxide) | 1314-13-2 | Zinc Corporation of America |
| Irganox 1076 | 2082-79-3 | Ciba Specialty Chemicals Corporation |
| Irganox B225 | / | Ciba Specialty Chemicals Corporation |

TABLE 5

| Composition and material characteristics of polymer ingredients | | | | | | |
|---|---|---|---|---|---|---|
| | Density (g/cm³) | $M_w$ (kg/mol) | $M_w/M_n$ | Melt Index (g/10 min) | Crystallinity (%) | Comonomer (mol %) |
| NORDEL 47130 | 0.984 | 240 | 2.45 | 145 Mooney (ML1 + 4) | 9 | 29 |
| NORDEL 4570 | 0.860 | 210 | 2.55 | 68 Mooney (ML1 + 4) | 1 | 45 |
| ENGAGE ™ 8150 | 0.868 | 176 | 2.03 | 0.5 (2.16 kg/190° C.) | 16 | 36 |
| B1 | 0.876 | 123 | 2.2 | 3.8 (2.16 kg/190° C.) | / | 45 |
| C1 | 0.878 | 128 | 2.1 | 1.6 (2.16 kg/190° C.) | / | 34 |
| PROFAX 6823 | 0.906 | / | / | 0.45 (2.16 kg/230° C.) | / | / |
| DOW H700-12 | 0.90 | / | / | 12 (2.16 kg/230° C.) | / | / |
| DOW 5D49 | 0.90 | / | / | 38 (2.16 kg/230° C.) | / | / |

TPV Example 1

Twin Screw Extruder Continuous TPV Process Using NORDEL MG as the Rubber Phase Preparation Steps:

The process oil, EPDM resin, polypropylene powder, OBC resin, wax, and powder additives are compounded in a Coperion 25-mm co-rotating twin screw extruder (TSE). Part of the process oil is fed into the second barrel section using a positive displacement gear pump and an injection valve that minimizes backflow. The appropriate amount of melted SP 1045 phenolic curing resin is added slowly to 3000 grams process oil at a minimum 90° C. temperature under agitation. Additional oil and the phenolic curing resin melted into additional process oil are injected in one barrel. All oil streams are preheated using a jacketed reservoir and heat-traced transfer lines. Low molecular weight volatile components are removed by devolatilization ports. The material is then cooled and pelletized using a strand or underwater pelletizer at the end of the extruder.

The extruder has twelve-barrel sections, resulting in a total length-to-diameter (L/D) ratio of 49. The feed system for this extrusion line has two loss-in-weight feeders. The NORDEL MG resin pellets, wax and 1 percent process oil are preblended in a plastic bag prior to adding into the main feed throat of the extruder using a K-Tron KCLQX3 single-screw feeder. The powder additives are either fed alone or premixed with polypropylene powder. The polypropylene powder is mixed with all the other powder additives and tumble blended in a plastic bag prior to metering the material using a K-Tron KCLKT20 twin-screw powder feeder.

The process oil is added to the extruder using a Leistritz Gear Pump cart with two heat traced liquid feed systems.

A vacuum system is used to remove residual volatile components from the melt near the end of the extruder. Two knock-out pots in series are filled with dry ice and isopropyl alcohol to condense the volatile components. For compounded pellets, the polymer discharged from the extruder is cooled in a 10-foot long water bath, and cut into cylinders with a Conair model 304 strand pelletizer. Discharge temperatures are measured using a hand-held thermocouple probe placed directly in the melt stream.

Formulations and Properties of NORDEL MG Examples:

TABLE 6

| Ingredients (parts per hundred) | Comparative Example T1 | Example T4 | Example T5 |
|---|---|---|---|
| EPDM (NORDEL MG 47130) | 128 | 121.6 | 121.6 |
| PP 5D-49 | 50 | 50 | 50 |
| B1 | | 7.5 | |
| C1 | | | 7.5 |
| Sunpar 150 Oil | 130 | 130 | 130 |
| SP 1045 Phenolic Resin | 3 | 3 | 3 |
| Stannous Chloride (Dihydrate) | 1.7 | 1.7 | 1.7 |
| Sunproof Improved (wax) | 3 | 3 | 3 |
| Kadox 720 (zinc oxide) | 2 | 2 | 2 |
| Irganox 1076 | 1 | 1 | 1 |

Table 6 shows the formulations of TPV examples using NORDEL MG as the rubber phase. The examples include a control example, Comparative T1, which is prepared without OBC compatibilizers, and two inventive examples, Examples T4 and T5, of TPV prepared with 5 wt % Examples B1 and C1, based on total polymer base, as compatibilizers. Table 7 lists their key mechanical properties. A comparison of Example T4 to Example T1 shows the addition of Example B1 resulted in a softer composition, with a significant decrease in the compression set at 70° C. and 120° C. while tensile strength was preserved. Example T5 had a similar hardness, tensile strength, elongation, and compression set at 70° C. relative to Example T1, but showed improved compression set at 120° C.

TABLE 7

Mechanical properties of TPV samples of the inventive and comparative examples

| Properties | Comparative Example T1 | Example T4 | Example T5 |
|---|---|---|---|
| Hardness (Shore A 10 sec) | 64 | 59 | 63 |
| Tensile Strength at break (psi) | 600 | 620 | 591 |
| Elongation at break (%) | 398 | 384 | 405 |
| Compression Set 25%, 22 hr at 70° C. (%) | 48 | 38 | 47 |
| Compression Set 25%, 70 hr at 120° C. (%) | 73 | 57 | 65 |

AFM phase images of Comparative Example T1 and Example T4 are shown in FIG. 15. The darker phase is cross-linked rubber particles, the lighter phases are polypropylene. The morphology of TPVs is typically a cross-linked rubber phase dispersed in a thermoplastic matrix. It may be seen that a finer morphology is achieved in the inventive example than in the comparative example, which demonstrates better compatibility between the EPDM and the PP phase.

TPV Example 2

Internal Mixer Batch TPV Process Using NORDEL IP as the Rubber Phase

Preparation Steps:

The EPDM (NORDEL IP 4570) was imbibed with oil in a glass jar at 50° C. for at least 24 hours. The oil-imbibed EPDM elastomer, thermoplastic (Polypropylene)) and compatibilizer (OBC) were added to a Haake mixer bowl at 190° C. and 35 RPM. The materials were mixed for 4 minutes at 75 rpm. The cure package (ZnO, SnCl2 and phenolic resin SP 1045) was added to the molten mixture, and the mixing was allowed to continue for 3 more minutes. The antioxidant was added, and the mixing was allowed to continue for one more minute. The melt was removed from the internal mixer, and allowed to further mix on a 2-roll mill at 190° C. The melt was passed through the mixer and the resulting sheet was rolled into a cigar-shaped specimen before being placed end-wise in to and passed through the mill. The procedure was repeated 6 times, and then the sample was taken off the mill as a sheet. The sheet from the mill was preheated in a heated press (190° C.) for two minutes under 2000 psi of pressure. Then the sheet was compression molded at 190° C. under 55000 psi of pressure for 4 minutes and then cooled for 4 minutes with 55000 psi of pressure. This procedure produced good test plaques with 1/16 inch and 1/8 inch thickness without visible cracks.

Formulations and Properties of NORDEL IP Examples:

Table 8 shows the formulations of numerous TPV examples using NORDEL IP as the rubber phase. Hydrobrite 550 Oil was added at 75 pph, SP 1045 phenolic resin was added at 3 pph, stannous chloride was added at 6 pph, Kadox 720 (zinc oxide) was added at 2 pph and Irganox 225 was added at 1 pph to each formulation. The examples include two comparative examples and 6 inventive examples of TPV prepared with Example B1 and C1 at three different concentration levels. Example C11 was a control example prepared without any compatibilizer. Example C12 was a comparative example prepared with 6 wt % random ethylene/octene copolymer as compatibilizer. Example C17 was prepared with 2 wt % of Example B1 on a total polymer base. Example C09 was prepared with 6 wt % of Example B1 on a total polymer base. Example C18 was prepared with 10 wt % of Example B1 on a total polymer base. Example C06 was prepared with 2 wt % of Example C1 on a total polymer base. Example C08 was prepared with 6 wt % of Example C1 on a total polymer base. Example C01 was prepared with 10 wt % of Example C1 on a total polymer base.

TABLE 8

| Ingredients (parts per hundred) | Comparative Example C11 | Comparative Example C12 | Example C17 | Example C09 | Example C18 | Example C06 | Example C08 | Example C01 |
|---|---|---|---|---|---|---|---|---|
| EPDM (Nordel IP 4570) | 100 | 94 | 98 | 94 | 90 | 98 | 94 | 90 |
| PP DOW H700-12 | 50 | 47 | 49 | 47 | 45 | 49 | 47 | 45 |
| ENGAGE 8150 | | 9 | | | | | | |
| B1 | | | 3 | 9 | 15 | | | |
| C1 | | | | | | 3 | 9 | 15 |

Table 9 shows physical properties of the formulations given in Table 8. As can be seen, tear strength, tensile strength and ultimate elongation increased for Comparative Example C12 and Inventive Examples C06, C08 and C01. However, only the inventive examples show significantly lower compression set, indicating better elastic recovery.

TABLE 9

| | Comparative Example C11 | Comparative Example C12 | Example C17 | Example C09 | Example C18 | Example C06 | Example C08 | Example C01 |
|---|---|---|---|---|---|---|---|---|
| Hardness (Shore A 10 sec) | 67 | 66 | 64 | 68 | 65 | 68 | 68 | 66 |
| Tear Strength (lb/inch) | 155 | 172 | 159 | 164 | 155 | 173 | 177 | 169 |
| Tensile Strength at break (psi) | 506 | 767 | 769 | 682 | 750 | 663 | 812 | 849 |
| Elongation at break (%) | 310 | 441 | 398 | 352 | 378 | 353 | 410 | 323 |
| Compression Set 25%, 22 hr at 70° C. (%) | 59 | 50 | 40 | 43 | 26 | 46 | 37 | 35 |
| Compression Set 25%, 70 hr at 120° C. (%) | 72 | 67 | 55 | 65 | 56 | 61 | 53 | 50 |

Table 10 shows another set of TPV examples using NORDEL IP as the rubber phase and a high molecular weight PP as the thermoplastic phase. The examples include a control example, which was prepared without OBC compatibilizers, and 6 inventive examples of TPV prepared with Example B1 and C1 at three different levels. Example TM1 was a control example prepared without OBC compatibilizer. Example C04, C02 and C19 were prepared with 2 wt %, 6 wt % and 10 wt % Example B1 on a total polymer base, respectively. Examples C20, C16 and C05 were prepared with 2 wt %, 6 wt % and 10 wt % Example B1 on a total polymer base, respectively.

TABLE 10

Formulations of inventive TPV examples and comparative TPV examples

| Ingredients (parts per hundred) | Comparative Example TM1 | Example C04 | Example C02 | Example C19 | Example C20 | Example C16 | Example C05 |
|---|---|---|---|---|---|---|---|
| EPDM (Nordel IP 4570) | 100 | 98 | 94 | 90 | 98 | 94 | 90 |
| PP PROFAX 6823 | 50 | 49 | 47 | 45 | 49 | 47 | 45 |
| B1 | | 3 | 9 | 15 | | | |
| C1 | | | | | 3 | 9 | 15 |

Hydrobrite 550 Oil was added at 75 pph, SP 1045 phenolic resin was added at 3 pph, stannous chloride was added at 6 pph, Kadox 720 (zinc oxide) was added at 2 pph and Irganox 225 was added at 1 pph to each formulation. Table 11 shows the mechanical properties of the TPVs samples. A comparison of the physical properties between Example C04 and control Example TM1 shows by addition 2 wt % OBC, a stiffer TPV with dramatically higher elongation, higher tensile strength and lower compression set were achieved. All other inventive Examples with OBCs show the similar effect as Example C04 with improvement in every property.

TABLE 11

Key mechanical properties of TPV samples of the inventive and comparative examples

| | Comparative Example TM1 | Example C04 | Example C02 | Example C19 | Example C20 | Example C16 | Example C05 |
|---|---|---|---|---|---|---|---|
| Hardness (Shore A 10 sec) | 60 | 67 | 68 | 68 | 67 | 63 | 68 |
| Tensile Strength at break (psi) | 424 | 978 | 834 | 757 | 819 | 773 | 934 |
| Elongation at break % | 285 | 391 | 393 | 350 | 387 | 438 | 389 |
| Compression Set 25%, 22 hr at 70° C. (%) | 55 | 35 | 43 | 41 | 34 | 43 | 35 |
| Compression Set 25%, 70 hr at 120° C. (%) | 79 | 51 | 58 | 58 | 50 | 58 | 49 |

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. Finally, any number disclosed herein should be construed to mean approximate, regardless of whether the word "about" or "approximately" is used in describing the number. The appended claims intend to cover all those modifications and variations as falling within the scope of the invention.

We claim:

1. A thermoplastic vulcanizate composition obtained from a reaction mixture comprising:
   a) a vulcanizable elastomer;
   b) a thermoplastic polyolefin;
   c) a cross-linking agent; and,
   d) a block composite, wherein the thermoplastic vulcanizate has a reduction in compression set at 70° C. of greater than 5% as compared to the thermoplastic vulcanizate without (d) wherein the block composite comprises a soft copolymer, a hard polymer and a block copolymer having a soft segment and a hard segment, wherein the hard segment of the block copolymer is the same composition as the hard polymer in the block composite and the soft segment of the block copolymer is the same composition as the soft copolymer of the block composite and the hard segment comprises 80 wt% to 100 wt% propylene.

2. The composition of claim 1 wherein (d) has a Block Composite Index ≥0.10.

3. The composition of claim 1 wherein the block composite comprises diblock copolymers having isotactic polypropylene blocks and ethylene-propylene blocks.

4. The composition of claim 3 wherein the isotactic polypropylene blocks are present in an amount of 10 wt% to 90 wt%.

5. The composition of claim 3 wherein the ethylene content of the ethylene-propylene blocks is 35 wt% to 70 wt%.

6. The composition of claim 1 wherein the block composite is present in an amount of 1 wt % to 30 wt %.

7. The composition of claim 1 wherein the melt flow rate of the block composite, measured at 230° C. and 2.16 kg weight, is 0.1 dg/min to 50 dg/min.

8. The composition of claim 1 wherein the vulcanizable elastomer is selected from the group consisting of EPDM, ethylene/α-olefins, olefin block copolymers and block composites.

9. The composition of claim 1 wherein the thermoplastic polyolefin is selected from the group consisting of polyethylene, polypropylene homopolymers, polypropylene copolymers and block composites.

10. An article comprising the composition of claim 1.

* * * * *